US011165337B2

(12) United States Patent
Hiasa et al.

(10) Patent No.: US 11,165,337 B2
(45) Date of Patent: Nov. 2, 2021

(54) INTEGRATED CIRCUIT FOR POWER FACTOR CORRECTION AND POWER SUPPLY CIRCUIT CONTAINING THE SAME

(71) Applicant: FUJI ELECTRIC CO., LTD., Kawasaki (JP)

(72) Inventors: Nobuyuki Hiasa, Matsumoto (JP); Yuta Endo, Matsumoto (JP); Yukihiro Yaguchi, Matsumoto (JP)

(73) Assignee: FUJI ELECTRIC CO., LTD., Kawasaki (JP)

(*) Notice: Subject to any disclaimer, the term of this patent is extended or adjusted under 35 U.S.C. 154(b) by 5 days.

(21) Appl. No.: 16/713,100

(22) Filed: Dec. 13, 2019

(65) Prior Publication Data
US 2021/0067032 A1     Mar. 4, 2021

(30) Foreign Application Priority Data

Sep. 4, 2019   (JP) .............................. JP2019-161013

(51) Int. Cl.
*H02M 7/217*    (2006.01)
*H02M 1/42*     (2007.01)
*H02M 1/00*     (2006.01)

(52) U.S. Cl.
CPC ....... *H02M 1/4208* (2013.01); *H02M 7/2176* (2013.01); *H02M 1/0025* (2021.05)

(58) Field of Classification Search
CPC ............. H02M 1/4208; H02M 1/4225; H02M 7/2176; H02M 2001/0025
See application file for complete search history.

(56) References Cited

U.S. PATENT DOCUMENTS 6,768,655 B1 *  7/2004  Yang ................... H02M 1/4225
                                                        363/21.01
9,509,214 B2 * 11/2016  Ali ......................... H02M 3/157
(Continued)

FOREIGN PATENT DOCUMENTS

JP   2000-116134 A    4/2000
JP   2010-279190 A   12/2010
(Continued)

OTHER PUBLICATIONS

Yuta Endo et al., "FA1B00 Series" 4th-Generation Critical Conduction Mode, Power Factor Correction Control ICs, Fuji Electric Journal, vol. 91, No. 4, Dec. 30, 2018.

*Primary Examiner* — Sisay G Tiku
(74) *Attorney, Agent, or Firm* — Rabin & Berdo, P.C.

(57) ABSTRACT

A power supply circuit that generates an output voltage from an AC voltage. The power supply circuit includes a rectifier circuit that rectifies the AC voltage, an inductor receives a rectified voltage from the rectifier circuit, a transistor that controls an inductor current flowing through the inductor, and an integrated circuit that performs switching of the transistor. The integrated circuit includes an error output circuit that outputs an error between a feedback voltage and a reference voltage, a target value generating circuit that generates a target value of the inductor current based on the error, an adjustment circuit that adjusts the target value, first and second comparison circuits that compare the inductor current with a predetermined value and with the target value, respectively, and a drive circuit that turns on the transistor when the inductor current reaches the predetermined value, and turns off the transistor when the inductor current reaches the target value.

17 Claims, 14 Drawing Sheets

(56) References Cited

U.S. PATENT DOCUMENTS

| | | | |
|---|---|---|---|
| 9,531,266 B2* | 12/2016 | Sreenivas | H02M 3/156 |
| 2004/0263140 A1* | 12/2004 | Adragna | G05F 1/70 |
| | | | 323/282 |
| 2007/0096711 A1* | 5/2007 | Ishii | H02M 3/1563 |
| | | | 323/288 |
| 2009/0302820 A1* | 12/2009 | Shimizu | H02M 3/156 |
| | | | 323/285 |
| 2012/0026765 A1* | 2/2012 | Adragna | H02M 1/42 |
| | | | 363/78 |
| 2012/0026766 A1* | 2/2012 | Adragna | H02M 1/4225 |
| | | | 363/84 |
| 2012/0250381 A1* | 10/2012 | Takahashi | H02M 1/4225 |
| | | | 363/124 |
| 2014/0228980 A1* | 8/2014 | Ohta | B29C 45/77 |
| | | | 700/29 |
| 2018/0278151 A1* | 9/2018 | Gritti | H02M 1/4225 |
| 2019/0081553 A1* | 3/2019 | Sugimoto | H02M 1/4225 |
| 2019/0334431 A1* | 10/2019 | Spohn | H02M 1/4225 |
| 2020/0195140 A1* | 6/2020 | Arbetter | H02M 1/08 |
| 2020/0245432 A1* | 7/2020 | Lee | H05B 45/14 |

FOREIGN PATENT DOCUMENTS

| | | |
|---|---|---|
| JP | 2015-201916 A | 11/2015 |
| JP | 2019-054573 A | 4/2019 |

* cited by examiner

INTEGRATED CIRCUIT FOR POWER FACTOR CORRECTION AND POWER SUPPLY CIRCUIT CONTAINING THE SAME

CROSS-REFERENCE TO RELATED APPLICATIONS

The present application claims priority pursuant to 35 U.S.C. § 119 from Japanese patent application number 2019-161013, filed on Sep. 4, 2019, the entire disclosure of which is hereby incorporated by reference herein.

BACKGROUND

Technical Field

The present invention relates to an integrated circuit and a power supply circuit.

Description of the Related Art

One example of power supply circuit that improves a power factor while generating an output voltage of a target level from an AC voltage is a power-factor correction circuit (for example, Japanese Patent Application Publication No. 2019-054573).

A typical power-factor correction circuit has a primary object to cause a waveform of an inductor current to be similar to that of an AC voltage while causing a power supply circuit to stably operate under a predetermined condition. Thus, it is difficult to desirably operate the power supply circuit, for example, when an interruption of the AC voltage, a sudden load change, and/or the like occurs so that an operating condition of the power-factor correction circuit greatly changes.

The present disclosure has been achieved in light of the aforementioned issue, and an object of the present disclosure is to provide an integrated circuit that desirably operates a power supply circuit even when an operating condition changes.

SUMMARY

According to a first aspect of the present disclosure, there is provided an integrated circuit that performs switching of a transistor for controlling an inductor current, based on an output voltage generated from an AC voltage and the inductor current flowing through an inductor, the inductor being configured to be applied with a rectified voltage from a rectifier circuit that rectifies the AC voltage, the integrated circuit comprising: an error output circuit that outputs an error between a feedback voltage and a reference voltage, the feedback voltage corresponding to the output voltage; a target value generating circuit that generates a target value of the inductor current based on the error; an adjustment circuit that is connected to the target value generating circuit, and adjusts the target value; a first comparison circuit that compares the inductor current and a predetermined value smaller than the target value; a second comparison circuit that compares the inductor current and the target value; and a drive circuit that turns on the transistor when the inductor current reaches the predetermined value, and turns off the transistor when the inductor current reaches the target value.

According to a second aspect of the present disclosure, there is provided an integrated circuit that performs switching of a transistor for controlling an inductor current, based on an output voltage generated from an AC voltage and the inductor current flowing through an inductor, the inductor being configured to be applied with a rectified voltage from a rectifier circuit that rectifies the AC voltage, the integrated circuit comprising: an error output circuit that outputs an error between a feedback voltage and a reference voltage, the feedback voltage corresponding to the output voltage; a target value generating circuit that generates a target value of the inductor current based on the error; a first comparison circuit that compares the inductor current and a predetermined value smaller than the target value; a second comparison circuit that compares the inductor current and the target value; a drive circuit that turns on the transistor when the inductor current reaches the predetermined value, and turns off the transistor when the inductor current reaches the target value; a first adjustment circuit that reduces the target value, when the AC voltage is not being input to the rectifier circuit; and a second adjustment circuit that increases the target value, when the feedback voltage has dropped to a predetermined level while the AC voltage is being input to the rectifier circuit.

According to a third aspect of the present disclosure, there is provided an integrated circuit that performs switching of a transistor for controlling an inductor current, based on an output voltage generated from an AC voltage and the inductor current flowing through an inductor, the inductor being configured to be applied with a rectified voltage from a rectifier circuit that rectifies the AC voltage, the integrated circuit comprising: an error output circuit that outputs an error between a feedback voltage and a reference voltage, the feedback voltage corresponding to the output voltage; a target value generating circuit that generates a target value of the inductor current based on the error; a first comparison circuit that compares the inductor current and a predetermined value smaller than the target value; a second comparison circuit that compares the inductor current and the target value; and a drive circuit that turns on the transistor, when the inductor current reaches the predetermined value, and turns off the transistor, when the inductor current reaches the target value or a predetermined time period has elapsed since the transistor has been turned on.

According to a fourth aspect of the present disclosure, there is provided a power supply circuit that generates an output voltage from an AC voltage, the power supply circuit comprising a rectifier circuit that rectifies the AC voltage, an inductor to be applied with a rectified voltage from the rectifier circuit, and an integrated circuit that performs switching of a transistor for controlling an inductor current, based on the output voltage and the inductor current flowing through the inductor, the integrated circuit comprising: an error output circuit that outputs an error between a feedback voltage and a reference voltage, the feedback voltage corresponding to the output voltage; a target value generating circuit that generates a target value of the inductor current based on the error; an adjustment circuit that is connected to the target value generating circuit, and adjusts the target value; a first comparison circuit that compares the inductor current and a predetermined value smaller than the target value; a second comparison circuit that compares the inductor current and the target value; and a drive circuit that turns on the transistor when the inductor current reaches the predetermined value, and turns off the transistor when the inductor current reaches the target value.

According to the present disclosure, it is possible to provide an integrated circuit that desirably operates a power supply circuit even when an operating condition changes.

DETAILED DESCRIPTION

At least the following details will become apparent from descriptions of the present specification and of the accompanying drawings.

Present Embodiment

Figure 1:
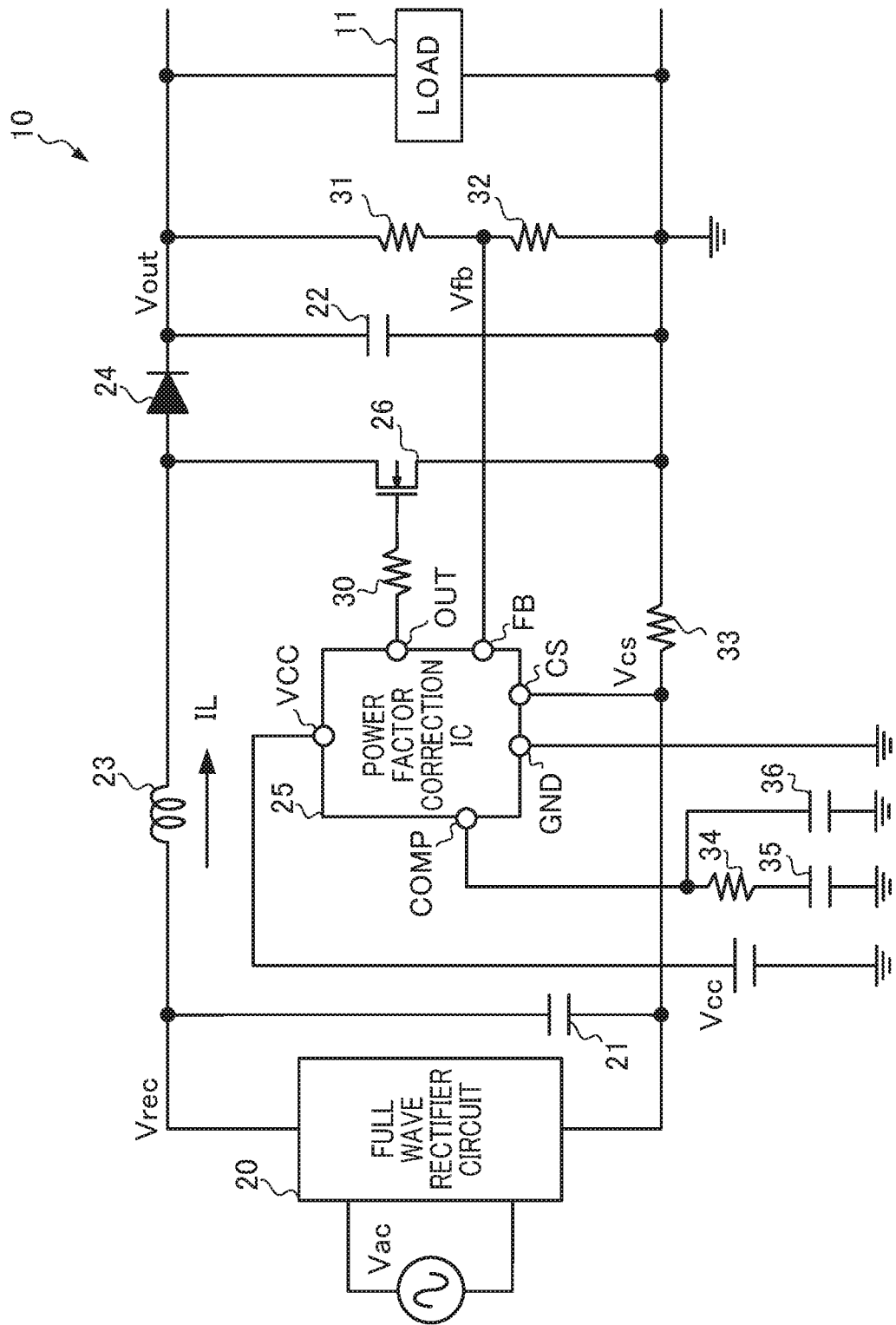
FIG. 1 is a diagram illustrating one example of an AC-DC converter 10.

FIG. 1 is a diagram illustrating a configuration of an AC-DC converter 10 according to one embodiment of the present disclosure. The AC-DC converter 10 is a boost-chopper-type power supply circuit that generates an output voltage Vout at a target level from an AC voltage Vac of a commercial power supply. A load 11 is a DC-DC converter or an electronic device that operates with a direct current voltage, for example.

<<<Outline of AC-DC Converter 10>>>

The AC-DC converter 10 comprises a full wave rectifier circuit 20, capacitors 21, 22, 35, and 36, an inductor 23, a diode 24, a power factor correction IC 25, an NMOS transistor 26, and resistors 30 to 34.

The full wave rectifier circuit 20 full-wave rectifies the applied predetermined AC voltage Vac, and outputs the result to a capacitor 21 and the inductor 23 as a rectified voltage Vrec. Note that the AC voltage Vac has, for example, a voltage of 100 to 240V and a frequency of 50 to 60 Hz.

The capacitor 21 smooths the rectified voltage Vrec, and the capacitor 22 configures a boost chopper circuit with the inductor 23, the diode 24, and the NMOS transistor 26. Accordingly, the charge voltage of the capacitor 22 is a DC output voltage Vout. Note that the output voltage Vout is, for example, 400V.

The power factor correction IC 25 is an integrated circuit that controls switching of the NMOS transistor 26 such that the output voltage Vout reaches the target level (e.g., 400V) while improving a power factor of the AC-DC converter 10. In specific, the power factor correction IC 25 drives the NMOS transistor 26 based on an inductor current IL flowing through the inductor 23 and the output voltage Vout.

The details of the power factor correction IC 25 will be described later, but the power factor correction IC 25 has terminals VCC, CS, FB, COMP, GND, and OUT. Note that the power factor correction IC 25 has terminals other than the aforementioned six terminals, but they are omitted for convenience. Further, the power factor correction IC 25 corresponds to an "integrated circuit", and the AC-DC converter 10 corresponds to a "power supply circuit".

The NMOS transistor 26 is a switching device that controls power to the load 11 in the AC-DC converter 10. In an embodiment of the present disclosure, it is assumed that the NMOS transistor 26 is a Metal Oxide Semiconductor (MOS) transistor, but the present disclosure is not limited thereto. The NMOS transistor 26 may be, for example, a PMOS transistor or a bipolar transistor, as long as it is a power transistor capable of controlling power.

Note that the resistor 30 for reducing switching noise is connected between the gate electrode of the NMOS transistor 26 and the terminal OUT.

The resistors 31 and 32 configure a voltage divider circuit that divides the output voltage Vout, and generates a feedback voltage Vfb to be used when performing switching of the NMOS transistor 26. The feedback voltage Vfb generated at the node at which the resistors 31 and 32 are connected is applied to the terminal FB.

The resistor 33 detects the inductor current IL, and has one end connected to the source electrode of the NMOS transistor 26 and the other end connected to the terminal CS. In an embodiment of the present disclosure, a voltage, indicating the inductor current IL, to be input to the terminal CS is given as a voltage Vcs.

The resistor 34 and the capacitors 35 and 36 are elements for phase compensation of the power factor correction IC 25 that is feedback-controlled. The resistor 34 and the capacitor 35 are connected in series between the terminal COMP and the ground, and the capacitor 36 is connected in parallel therewith.

A power supply voltage Vcc for operating the power factor correction IC 25 is applied to the terminal VCC. Note that the power supply voltage Vcc is generated based on a voltage of an auxiliary inductor (not illustrated) magnetically coupled to the inductor 23, for example. Further, the terminal GND is connected to a wiring (not illustrated) serving as a reference (0V) of the AC-DC converter 10.

===Power Factor Correction IC 25===

Figure 2:
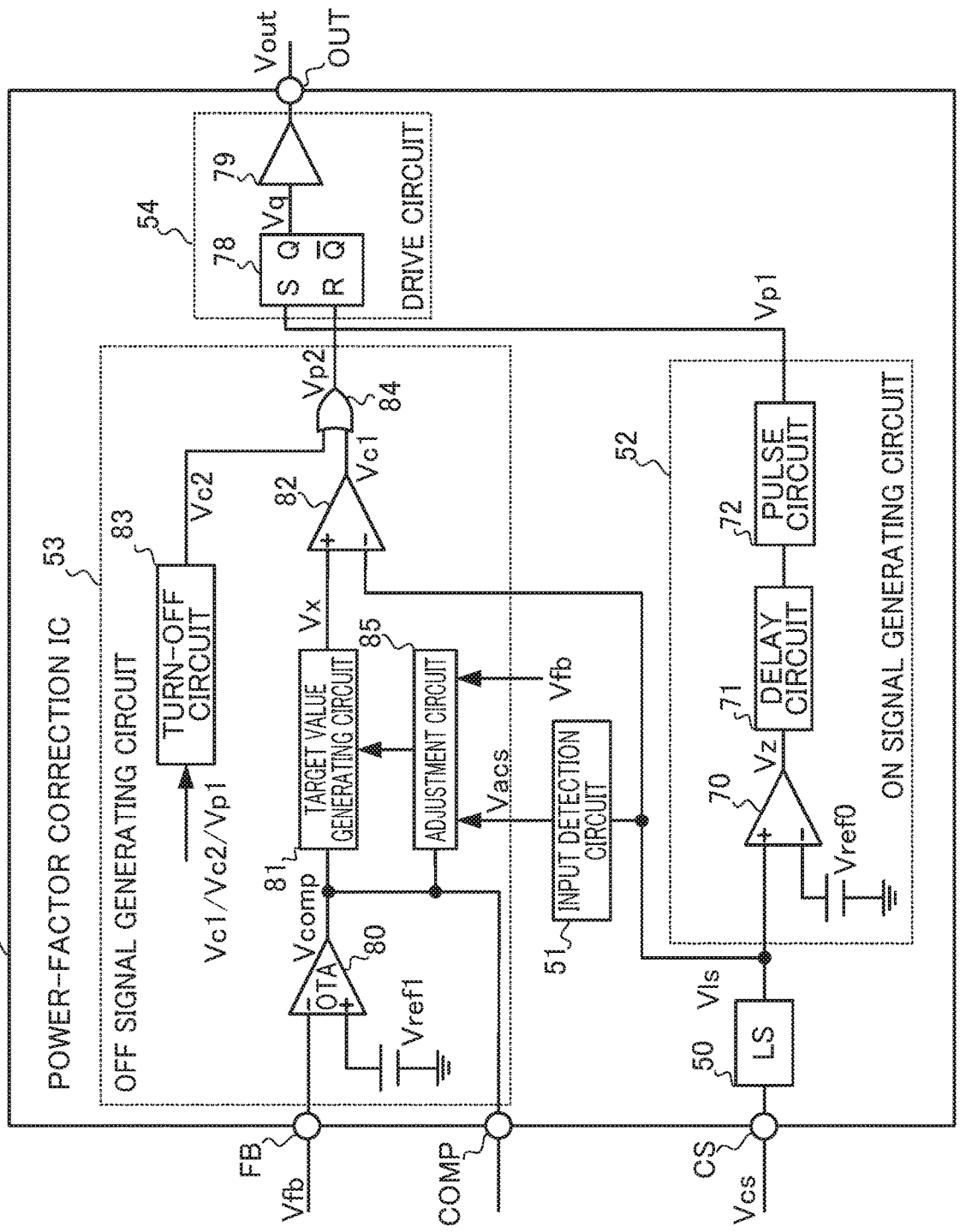
FIG. 2 is a diagram illustrating one example of a power-factor correction IC 25.

FIG. 2 is a diagram illustrating one example of a configuration of the power factor correction IC 25. The power factor correction IC 25 is a current mode control IC that controls a peak value of the inductor current IL such that the output voltage Vout reaches the target level. The power factor correction IC 25 comprises a level shift circuit 50, an input detection circuit 51, an ON signal generating circuit 52, an OFF signal generating circuit 53, and a drive circuit 54.

<<Level Shift Circuit 50>>

Figure 3:
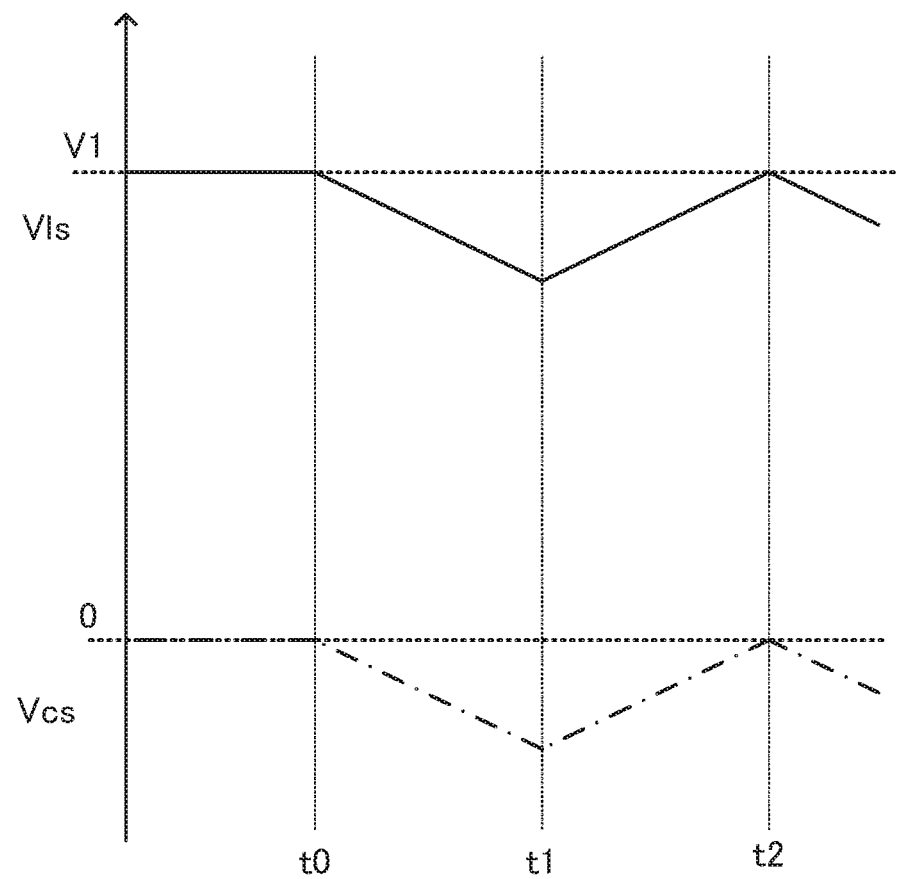
FIG. 3 is a diagram for explaining an operation of a level shift circuit 50.

The level shift circuit 50 shifts the level of the negative voltage Vcs smaller than "0V" by a predetermined voltage V1 (>0), and outputs a positive voltage Vls. FIG. 3 is a diagram illustrating a relationship between the voltage Vcs (dashed-dotted line) and the level-shifted voltage Vls (solid line).

For example, in a time period before a time t0, when the NMOS transistor 26 of FIG. 1 is off, the inductor current IL flowing through the resistor 33 is "0", and thus the voltage Vcs is "0V" as well. Accordingly, the voltage Vls results in the voltage V1.

Then, when the NMOS transistor 26 is turned on at the time t0, the inductor current IL increases, and thus the voltage Vcs decreases from "0V". Accordingly, the voltage Vls obtained by shifting the level of the voltage Vcs also decreases from the voltage V1.

Further, when the NMOS transistor 26 is turned off at a time t1, the inductor current IL decreases, and thus the voltage Vcs increases and reaches "0V" at a time t2, for example. Accordingly, the voltage Vls also reaches the voltage V1 at the time t2.

Accordingly, when the inductor current IL is "0", the voltage Vls according to an embodiment of the present disclosure reaches the voltage V1, and when the inductor current IL increases, the voltage Vls drops.

<<Input Detection Circuit 51>>

The input detection circuit 51 detects whether the AC voltage Vac is being input to the AC-DC converter 10. Note that, in an embodiment of the present disclosure, "a state where the AC voltage Vac is being input" indicates, for example, a state where the AC voltage Vac is being supplied to the AC-DC converter 10 (here, the full wave rectifier circuit 20). Further, "a state where the AC voltage Vac is not being input" indicates, for example, a state where the AC voltage Vac is interrupted and the supply of the AC voltage Vac to the AC-DC converter 10 is stopped.

Incidentally, when the AC voltage Vac is interrupted, the AC voltage Vac to the full wave rectifier circuit 20 reaches "0V". In this state, even if switching of the NMOS transistor 26 is performed, the inductor current IL is "0".

Figure 4:
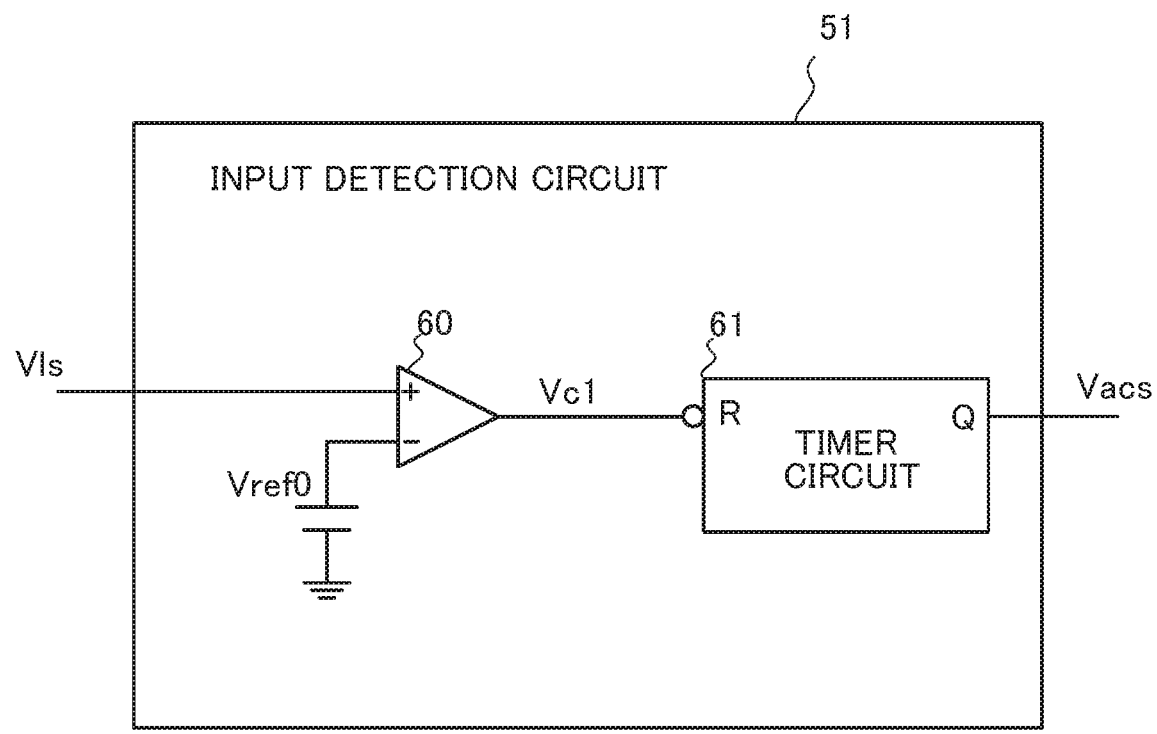
FIG. 4 is a diagram illustrating one example of an input detection circuit 51.

Accordingly, the input detection circuit 51 comprises, as illustrated in FIG. 4, a comparator 60 that detects whether the current value of the inductor current IL is "0", and a timer circuit 61 that measures a time period during which the inductor current IL is "0".

The comparator 60 compares the level between the voltage Vls and a reference voltage Vref0 (e.g., several tens of mV) corresponding to a predetermined current value Ia (e.g., several mA) that is slightly greater than zero, and detects whether the inductor current IL is substantially zero (hereinafter, "substantially zero" is simply referred to as "0" (zero) as appropriate).

In specific, when the voltage Vls is greater than the reference voltage Vref0, that is, the inductor current IL is "0", the comparator 60 outputs a high-level (hereinafter, high) signal Vc1. On the other hand, when the voltage Vls is smaller than the reference voltage Vref0, that it, the inductor current IL is greater than "0", the comparator 60 outputs a low-level (hereinafter, low) signal Vc1.

The timer circuit 61 measures a time period during which the high signal Vc1 indicating that the inductor current IL is "0" is being input to an R input, and when the low signal Vc1 is input to the R input, the timer circuit 61 resets the measured time period.

When a "predetermined time period Ta" is measured since the high signal Vc1 has been input, the timer circuit 61 detects an interruption of the AC voltage Vac, and changes a voltage Vacs to be output from a Q output from low to high. Note that when the AC voltage Vac, which has been interrupted, is restored, the timer circuit 61 changes the voltage Vacs from high to low.

It is assumed here that the timer circuit 61 measures a time period during which the signal Vc1 is high, but the present disclosure is not limited thereto. For example, when the AC voltage Vac is interrupted, the output voltage Vout and the feedback voltage Vfb drops. Thus, the timer circuit 61 may measure a time period during which the signal Vc1 is high as well as the feedback voltage Vfb drops and is at a predetermined level. In such a configuration as well, it is possible to appropriately detect an interruption of the AC voltage Vac.

<<ON Signal Generating Circuit 52>>

The ON signal generating circuit 52 outputs a signal Vp1 for turning on the NMOS transistor 26 when the inductor current IL becomes "0". The ON signal generating circuit 52 comprises a comparator 70, a delay circuit 71, and a pulse circuit 72.

The comparator 70 detects whether the current value of the inductor current IL is "0", similarly to the comparator 60. In specific, the comparator 70 compares the level between the voltage Vls and the reference voltage Vref0 corresponding to a current value slightly greater than zero, and detects whether the current value of the inductor current IL is "0".

Note that when the inductor current IL decreases and the voltage Vls rises above the reference voltage Vref0, the comparator 70 outputs a high signal Vz indicating that the inductor current IL is "0". Further, the comparator 70 corresponds to a "first comparison circuit", and the current value Ia to be compared with the inductor current IL corresponds to a "predetermined value".

When the high signal Vz is output from the comparator, the delay circuit 71 delays the signal Vz by a predetermined time period and outputs the delayed signal Vz.

When the high signal Vz is output from the delay circuit 71, the pulse circuit 72 outputs the high pulse signal Vp1.

<<OFF Signal Generating Circuit 53>>

The OFF signal generating circuit 53 outputs a signal Vp2 for turning off the NMOS transistor 26, when the peak value of the inductor current IL reaches a target value, or a predetermined time period has elapsed since the NMOS transistor 26 has been turned on. The OFF signal generating circuit 53 comprises a transconductance amplifier (hereinafter, referred to as the "OTA") 80, a target value generating circuit 81, a comparator 82, a turn-off circuit 83, an OR circuit 84, and an adjustment circuit 85.

The OTA 80 is an "error output circuit" that outputs an error between the feedback voltage Vfb to be applied to the terminal FB and a predetermined reference voltage Vref1. Note that the reference voltage Vref1 is determined according to the output voltage Vout at the target level. Further, the resistor 34 and the capacitors 35 and 36 for phase compensation are connected between the output of the OTA 80 and the ground via the terminal COMP. It is assumed here that a voltage at a node at which the output of the OTA 80 and the terminal COMP are connected is a voltage Vcomp.

Figure 5:
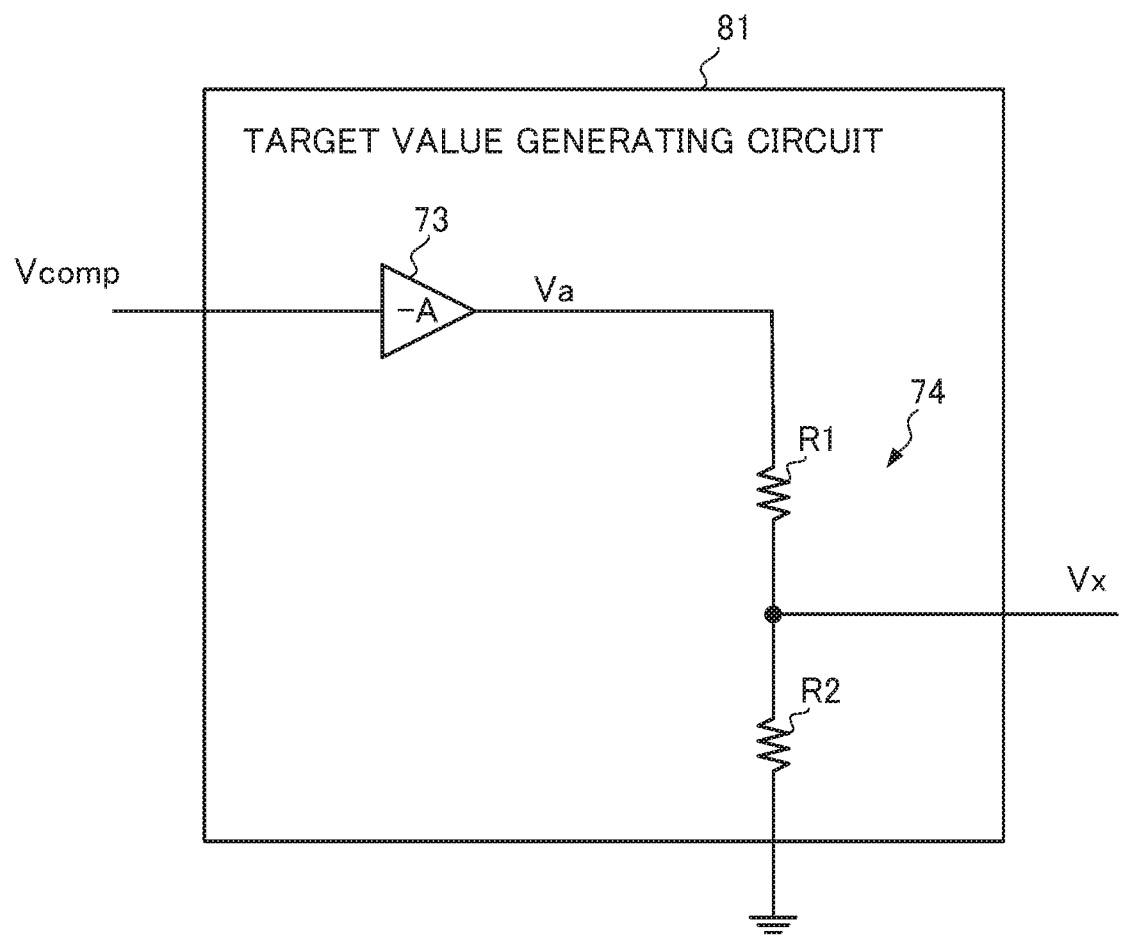
FIG. 5 is a diagram illustrating one example of a target value generating circuit 81.

The target value generating circuit 81 generates, based on the voltage Vcomp, the "target value" of the inductor current IL for causing the output voltage Vout to reach the target level. The target value generating circuit 81 comprises, as illustrated in FIG. 5, an inverting amplifier circuit 73 and a voltage divider resistor circuit 74.

The inverting amplifier circuit 73 inverts the voltage Vcomp, amplifies the result by a predetermined gain, and outputs the amplified result as a voltage Va. The voltage divider resistor circuit 74 outputs a voltage Vx obtained by dividing the voltage Va with resistors R1 and R2. It is assumed, in an embodiment of the present disclosure, that a node at which the resistor R1 and the resistor R2 are connected and the voltage Vx is generated is a "node X". Note that the inverting amplifier circuit 73 corresponds to a "voltage generating circuit".

The comparator 82 compares the voltage Vls and the voltage Vx, and outputs the signal Vc1 indicating whether the inductor current IL has reached the "target value". Here, the voltage Vx is applied to the non-inverting input terminal of the comparator 82, while the voltage Vls is applied to the inverting input terminal of the comparator 82. Accordingly, when the voltage Vls is higher in level than the voltage Vx, the signal Vc1 goes low, and the voltage Vls is lower in level than the voltage Vx, the signal Vc1 goes high.

Note that the high signal Vc1 is a signal indicating that the inductor current IL has reached the "target value". Further, the comparator 82 corresponds to a "second comparison circuit".

The turn-off circuit 83 determines the maximum ON time period of the NMOS transistor 26. In specific, the turn-off circuit 83 outputs a high signal Vc2 (described later) for turning off the NMOS transistor 26 when the high signal Vc1 is not output for a "predetermined time period Tb" since the NMOS transistor 26 has been turned on.

Figure 6:
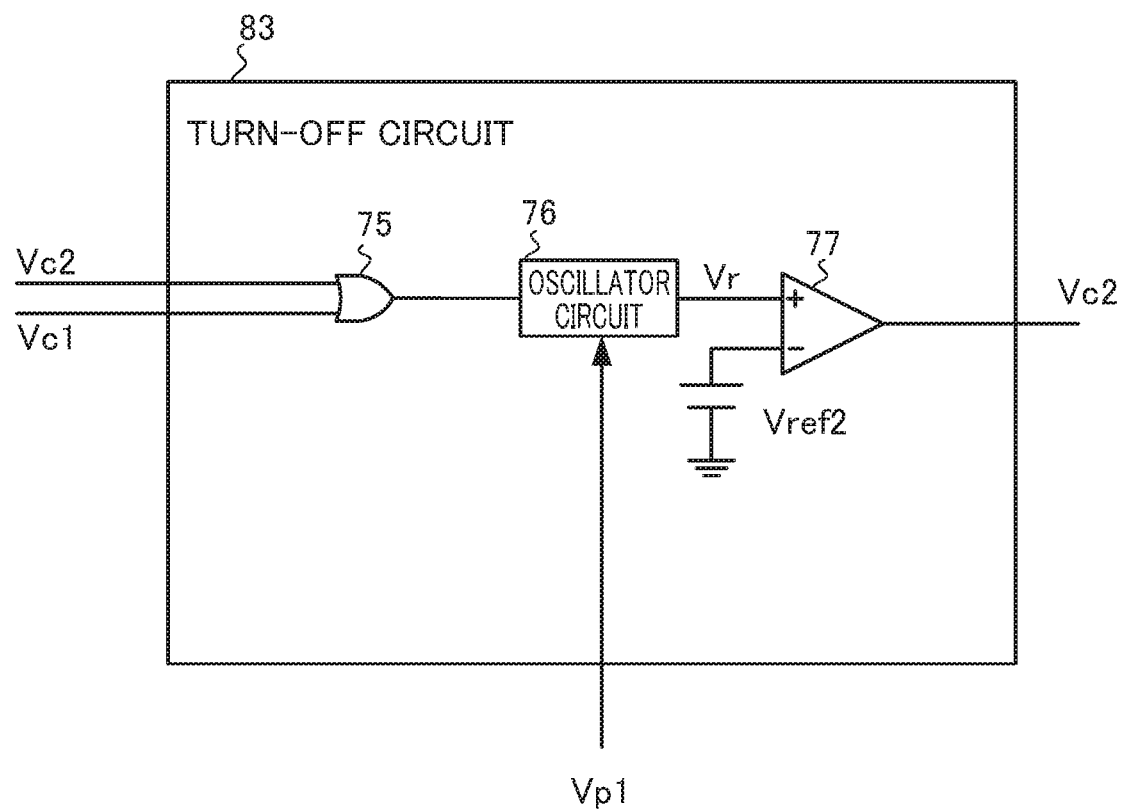
FIG. 6 is a diagram illustrating one example of a turn-off circuit 83.

The turn-off circuit 83 comprises, as illustrated in FIG. 6, an OR circuit 75, an oscillator circuit 76, and a comparator 77.

The OR circuit 75 calculates and outputs the logical sum of the signal Vc1 and the signal Vc2. The oscillator circuit 76 outputs a ramp wave Vr whose amplitude gradually increases from "0", when the high pulse signal Vp1 for turning on the NMOS transistor 26 is output. Further, the oscillator circuit 76 sets the amplitude of the ramp wave Vr to "0" when a high signal is output from the OR circuit 75.

The comparator 77 compares the level between a reference voltage Vref2 corresponding to the "predetermined time period Tb" and the ramp wave Vr, and outputs the signal Vc2 as the comparison result. The comparator 77 outputs a low signal Vc2 when the ramp wave Vr is lower in level than the reference voltage Vref2, and outputs a high signal Vc2 when the ramp wave Vr is higher in level than the reference voltage Vref2.

Accordingly, the turn-off circuit 83 outputs the high signal Vc2 only when the "predetermined time period Tb" has elapsed since the high signal Vp1 for turning on the NMOS transistor 26 has been input.

The OR circuit 84 calculates the logical sum between the signal Vc1 and the signal Vc2 and outputs the result as the signal Vp2. Thus, the signal Vp2 goes high, when the comparator 82 outputs the high signal Vc1 indicating that the voltage Vls corresponding to the inductor current IL has reached the voltage Vx indicating the "target value", or when the turn-off circuit 83 outputs the high signal Vc2.

The adjustment circuit 85 adjusts the voltage Vx indicating the "target value" of the inductor current IL based on the voltage Vacs and the feedback voltage Vfb, when either one of the AC voltage Vac and the feedback voltage Vfb satisfies a predetermined condition. Although the details of the adjustment circuit 85 will be described later, the adjustment circuit 85 is not operated, when the AC voltage Vac is input and the output voltage Vout at the target level is generated.

<<Drive circuit 54>>

The drive circuit 54 outputs a signal Vout for performing switching of the NMOS transistor 26 based on the signal Vp1 from the ON signal generating circuit 52 and the signal Vp2 from the OFF signal generating circuit 53. The drive circuit 54 comprises an SR flip-flop 78 and a buffer 79.

The signal Vp1 is input to an S input of the SR flip-flop 78, and the signal Vp2 is input to an R input thereof. Accordingly, a drive signal Vq, which is an output Q of the SR flip-flop 78, goes high when the signal Vp1 goes high. On the other hand, the drive signal Vq goes low when the signal Vp2 goes high.

The buffer 79 drives the NMOS transistor 26 having a large gate capacitance, etc., using the signal Vout at the same logic level as that of the input drive signal Vq.

===Operation of Power Factor Correction IC 25 when Output Voltage Vout is at Target Level===

Here, a description will be given of the operation of the power factor correction IC 25, when the AC-DC converter 10 generates the output voltage Vout at the target level from the predetermined AC voltage Vac and predetermined power is supplied to the load 11.

Note here that since the AC voltage Vac is input and the output voltage Vout is at the target level, the aforementioned adjustment circuit 85 (described later in detail) is not operated. Accordingly, the adjustment circuit 85 does not adjust the voltage Vx which serves as the target value of the inductor current IL.

Further, the inductor current IL varies with the level of the AC voltage Vac at a time when the NMOS transistor 26 is turned on. In specific, in a case where the level of the AC voltage Vac when the NMOS transistor 26 is turned on is high, the inductor current IL greatly increases, and reaches the "target value", for example. On the other hand, in a case where the level of the AC voltage Vac when the NMOS transistor 26 is turned on is low, the inductor current IL does not change much from "0", and does not reach the "target value".

Accordingly, when the level of the AC voltage Vac is low, the turn-off circuit 83 for turning off the NMOS transistor 26 operates. A description will be given below of the respective operations of the power factor correction IC 25 in the case where the level of the AC voltage Vac is high and the case where the level of the AC voltage Vac is low.

<<When Level of AC Voltage Vac is High>>

Figure 7:
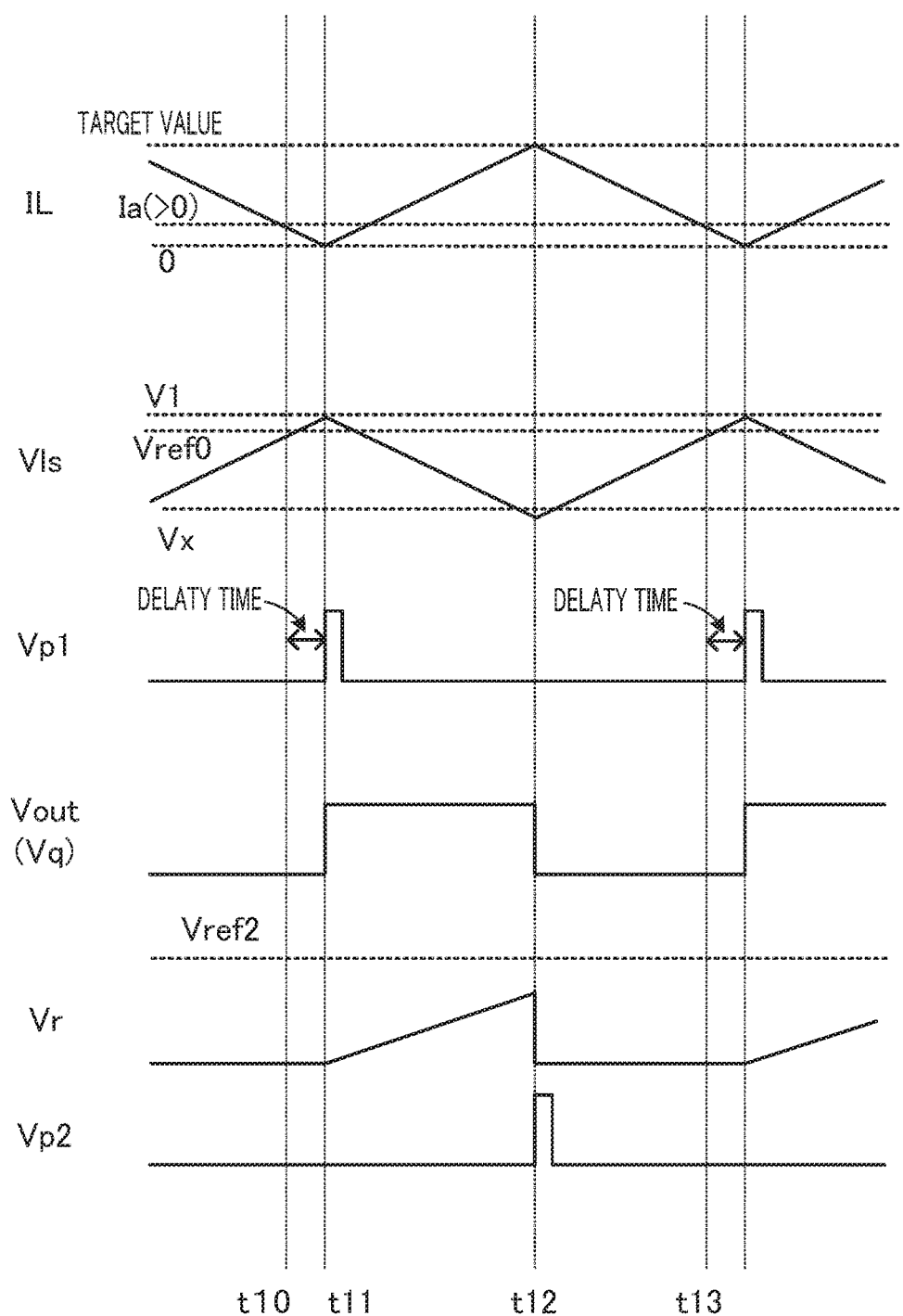
FIG. 7 is a diagram for explaining an operation of a power-factor correction IC 25.

FIG. 7 illustrates one example of waveforms in the power factor correction IC 25 when the level of the AC voltage Vac is high. First, when the inductor current IL decreases and reaches the current value Ia at a time t10, that is, the voltage Vls rises and reaches the reference voltage Vref0, the comparator 70 changes the signal Vz to high (not illustrated in FIG. 7). Further, at a time t11 when a delay time in the delay circuit 71 has elapsed since the time t10, the pulse circuit 72 outputs the pulse signal Vp1.

Then, when the pulse signal Vp1 is output, the SR flip-flop 78 outputs the high drive signal Vq, and thus the signal Vout also goes high. As a result, the NMOS transistor 26 is turned on and the inductor current IL increases. Further, when the pulse signal Vp1 is output, the amplitude of the ramp wave Vr of the oscillator circuit 76 in the turn-off circuit 83 increases.

Subsequently, when the voltage Vls reaches the voltage Vx at a time t12, that is, the inductor current IL reaches the "target value", the comparator 82 changes the signal Vc1 to high, and thus the signal Vp2 goes high as well.

As a result, the amplitude of the ramp wave Vr results in "0" with the SR flip-flop 78 being reset. Accordingly, the drive signal Vq and the signal Vout go low and the NMOS transistor 26 is turned off, and thus the inductor current IL gradually decreases. Further, when the inductor current IL decreases and reaches the current value Ia at a time t13, the operation from the time t10 is repeated.

As such, when the level of the AC voltage Vac is high, the peak value of the inductor current IL is controlled so as to reach the "target value" corresponding to the output voltage Vout at the target level.

<<When Level of AC Voltage Vac is Low>>

Figure 8:
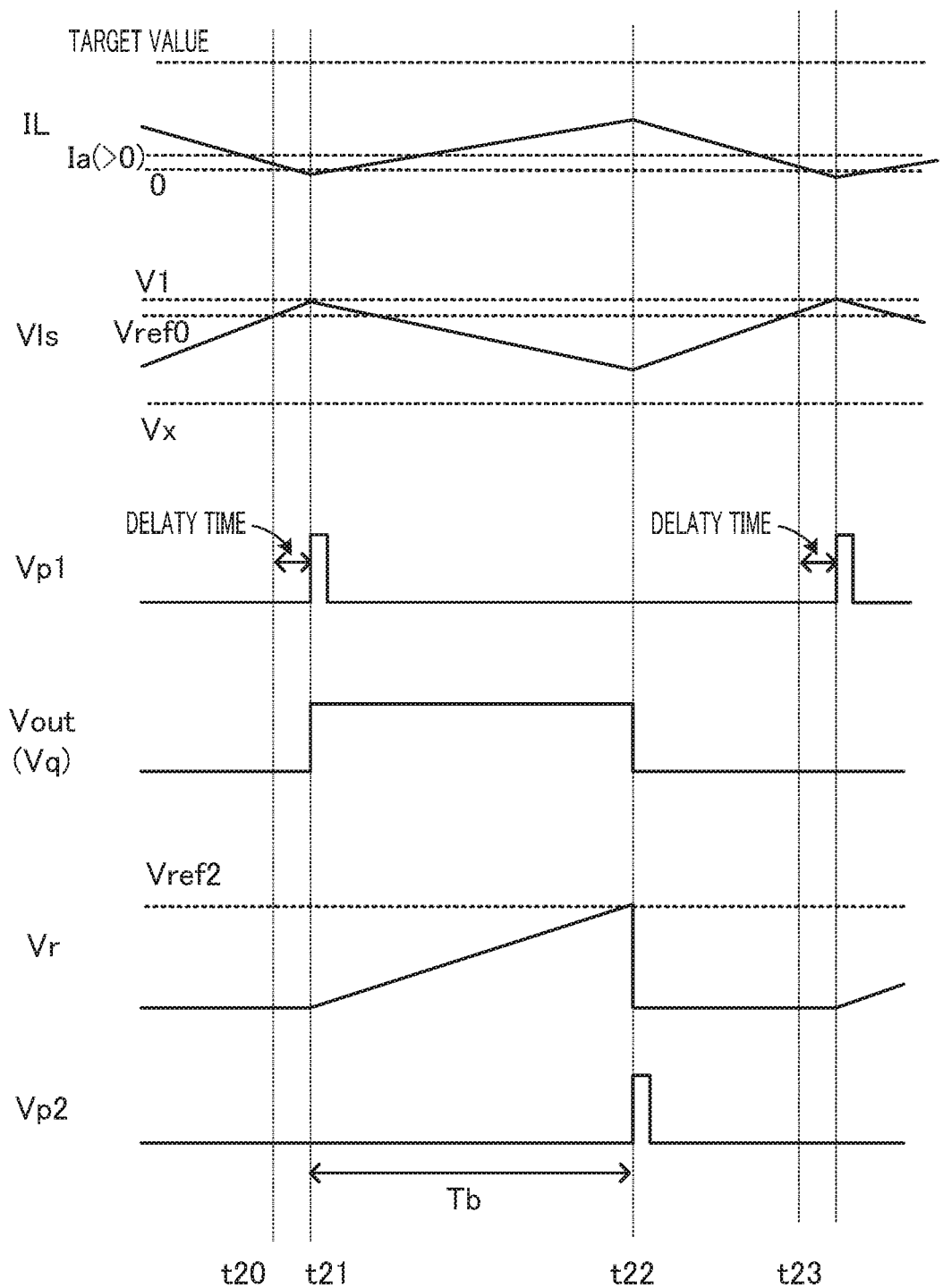
FIG. 8 is a diagram for explaining an operation of a power-factor correction IC 25.

FIG. 8 illustrates one example of waveforms in the power factor correction IC 25 when the level of the AC voltage Vac is low. First, when the inductor current IL decreases and reaches the current value Ia at a time t20, that is, the voltage Vls rises and reaches the reference voltage Vref0, the comparator 70 changes the signal Vz to high (not illustrated in FIG. 8). Further, at a time t21 when the delay time in the delay circuit 71 has elapsed since the time t20, the pulse circuit 72 outputs the pulse signal Vp1.

Then, the pulse signal Vp1 is output, the SR flip-flop 78 outputs the high drive signal Vq, and thus the signal Vout goes high as well. As a result, the NMOS transistor 26 is turned on, and the inductor current IL increases. Further, when the pulse signal Vp1 is output, the amplitude of the ramp wave Vr of the oscillator circuit 76 in the turn-off circuit 83 increases.

Here, even if the NMOS transistor 26 is turned on at the time t21, the level of the AC voltage Vac is low as described above, the inductor current IL does not increases much. Accordingly, at a time t22 before the voltage Vls drops to the voltage Vx, the ramp wave Vr reaches the reference voltage Vref2. Note that the time t22 is a timing at which the "predetermined time period Tb" has elapsed since the time t21 at which the NMOS transistor 26 has been turned on.

As a result, the comparator 77 changes the signal Vc2 to high, and thus the signal Vp2 goes high and the SR flip-flop 78 is reset. Accordingly, the drive signal Vq and the signal Vout go low, and the NMOS transistor 26 is turned off, and thus the inductor current IL gradually decreases. Further, when the inductor current IL decreases and reaches the current value Ia at a time t23, the operations from the time t20 is repeated.

As such, when the level of the AC voltage Vac is low, the NMOS transistor 26 is controlled so as to be ON for the "predetermined time period Tb".

<<Waveforms when AC Voltage Vac is Input for One Cycle>>

Figure 9:
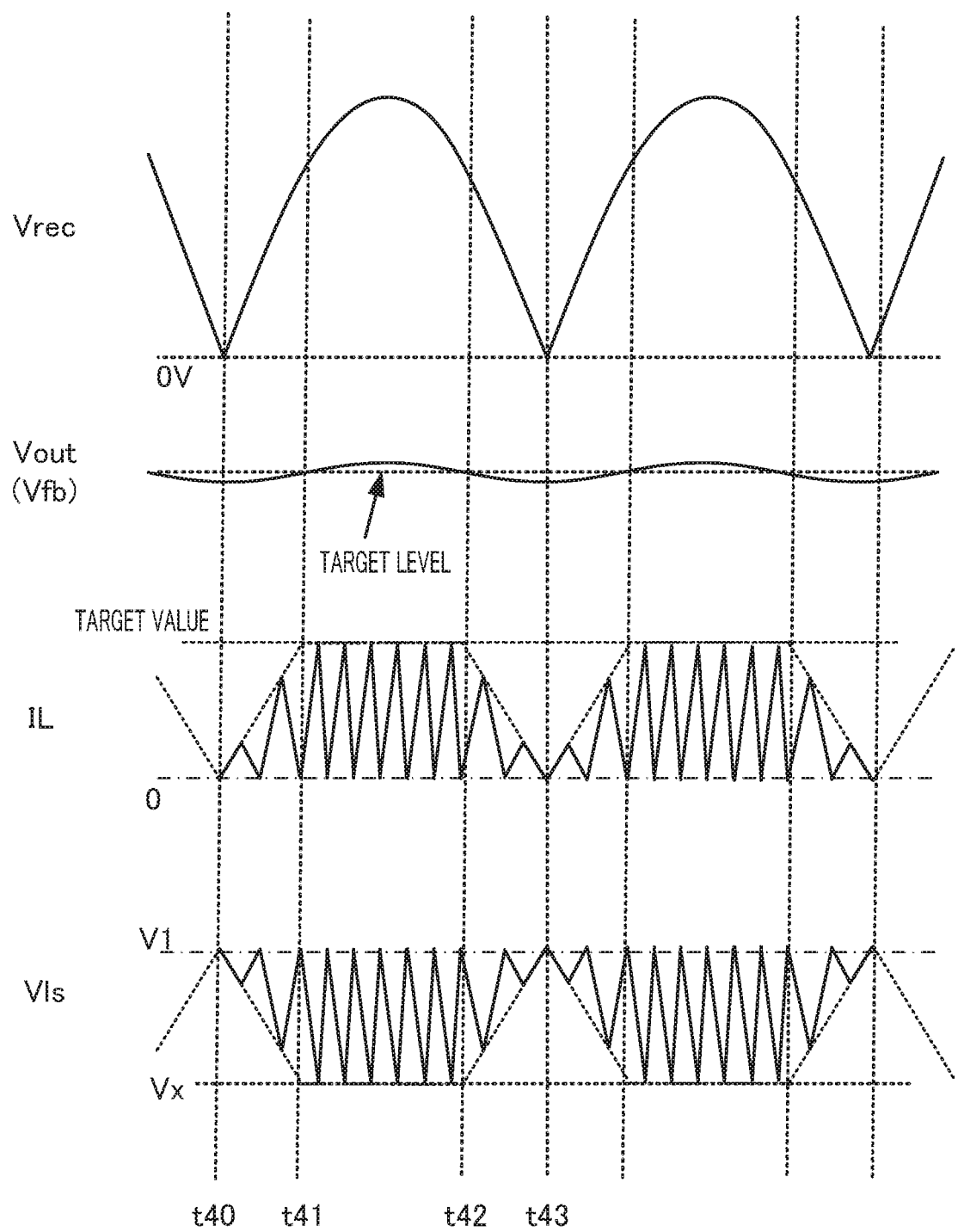
FIG. 9 is a diagram for explaining an operation of a power-factor correction IC 25.

FIG. 9 illustrates one example of main waveforms in the AC-DC converter 10 when the AC voltage Vac is input for one cycle. Here, when the AC-DC converter 10 generates the output voltage Vout at the target level from the AC voltage Vac, and supplies predetermined power to the load 11, the feedback voltage Vfb is constant. As a result, the level of the voltage Vx indicating the "target value" of the inductor current IL is constant as well.

In a time period from a time t40 to a time t41, since the level of the AC voltage Vac is low, the inductor current IL does not increases to the "target value". In this time period, the NMOS transistor 26 is controlled so as to be ON for the "predetermined time period Tb". Thus, the peak value of the inductor current IL increases as the level of the AC voltage Vac increases.

In the time period from the time t41 to a time t42, since the level of the AC voltage Vac is high, the inductor current IL increases to the "target value". As a result, in this time period, the peak value of the inductor current IL is controlled so as to reach the "target value" corresponding to the output voltage Vout at the target level.

Then, since a time period from the time t42 to a time t43 is the same as the time period from the time t40 to the time t41, the peak value of the inductor current IL decreases as the level of the AC voltage Vac drops. Note that the time t43 and thereafter is the same as the time t40 and thereafter, and thus the detailed description is omitted.

As such, in the AC-DC converter 10 according to an embodiment of the present disclosure, the peaks of the inductor current IL shape a trapezoidal waveform that changes similarly to the rectified voltage Vrec, thereby improving the power factor.

===Details of adjustment circuit 85===

It is assumed in FIGS. 7 to 9 that the output voltage Vout is at the target level, however, for example, when the output voltage Vout drops from the target level, the voltage Vcomp rises and the voltage Vx drops. As a result, the peak value of the inductor current IL increases, and thus the output voltage Vout rises.

On the other hand, when the output voltage Vout rises from the target level, the voltage Vcomp drops and the voltage Vx rises. As a result, the peak value of the inductor current IL decreases, and thus the output voltage Vout drops. Accordingly, the power factor correction IC 25 can adjust the level of the output voltage Vout by adjusting the voltage Vx (i.e., the "target value" of the peak value of the inductor current IL).

Here, the voltage Vx of the power factor correction IC 25 is generated based on the voltage Vcomp. However, the capacitors 35 and 36 having large capacitances are connected to the output of the OTA 80 that generates the voltage Vcomp. Accordingly, for example, when a sudden load change occurs, the OTA 80 cannot change the voltage Vcomp immediately.

Further, for example, when the AC voltage Vac is interrupted, the output voltage Vout drops, and thus the voltage Vcomp rises. Then, the target value generating circuit 81 generates the target value of the inductor current IL (i.e., the voltage Vx) such that the peak value of the inductor current IL increases. In such a situation, when the AC voltage Vac is restored, the large inductor current IL may flow through the NMOS transistor 26 with the AC voltage Vac being high in level. Accordingly, when the NMOS transistor 26 is turned off, a "surge voltage" may be generated.

Thus, the power factor correction IC 25 according to an embodiment of the present disclosure comprises the adjustment circuit 85 to suppress an abrupt increase in the inductor current IL when the AC voltage Vac is restored (or when it is input), and to causing the output voltage Vout to reach the target level in a short period of time when the output voltage Vout drops, for example.

<<Configuration of Adjustment Circuit 85>>

Figure 10:
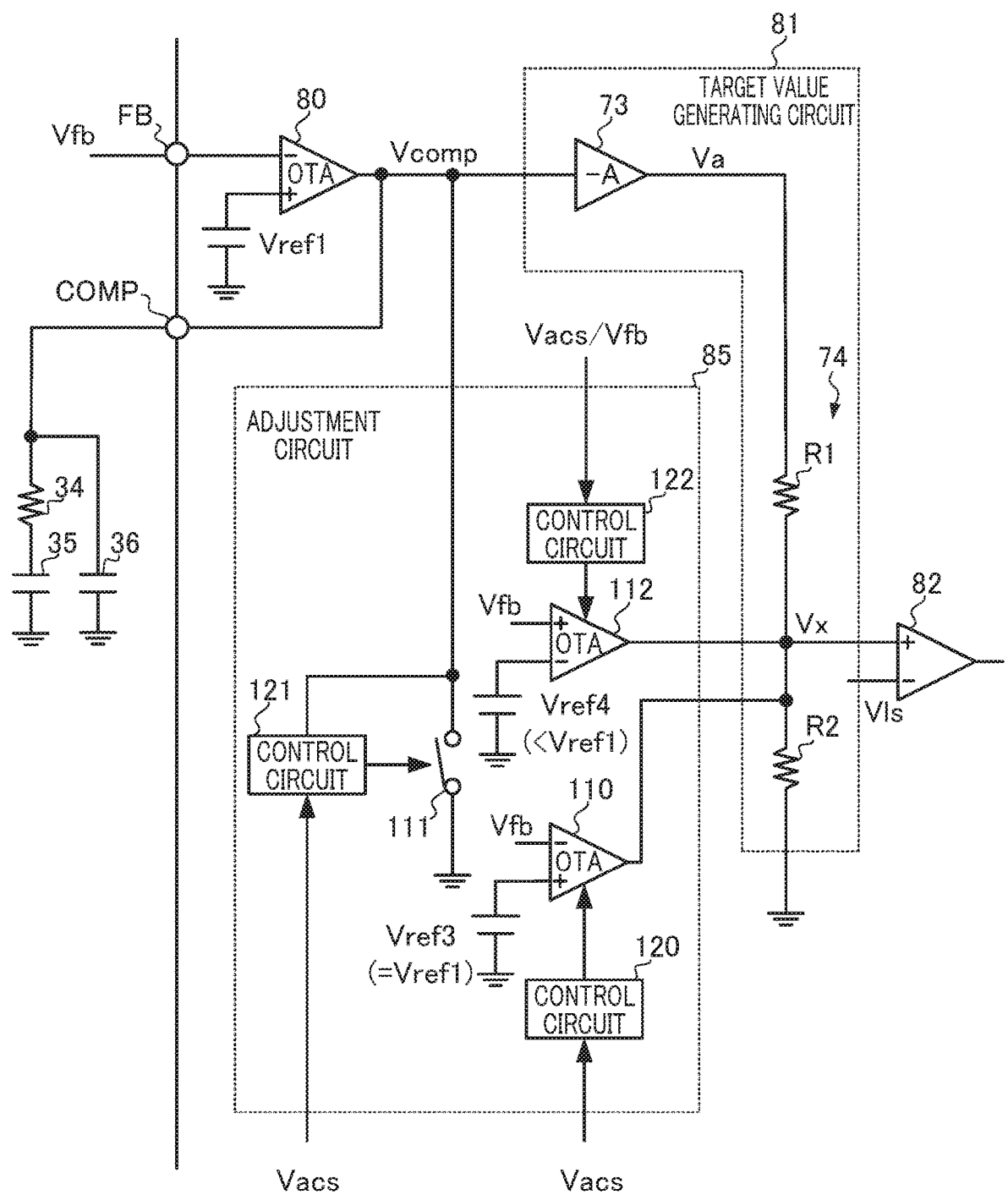
FIG. 10 is a diagram illustrating one example of an adjustment circuit 85.

FIG. 10 is a diagram illustrating one example of a configuration of the adjustment circuit 85. The adjustment circuit 85 comprises OTAs 110 and 112, a switch 111, and control circuits 120 to 122. Note that the OTA 110, the switch 111, the control circuits 120 and 121 correspond to a "first adjustment circuit", and the OTA 112 and the control circuit 120 correspond to a "second adjustment circuit".

<<OTA 110 and Control Circuit 120>>

The OTA 110 prevents the inductor current IL from becoming excessively large when the AC voltage Vac is input (or is restored). The OTA 110 supplies a current corresponding to a difference between the feedback voltage Vfb and a predetermined reference voltage Vref3 to the "node X" between the resistors R1 and R2. Here, the level of the reference voltage Vref3 is the same as the level of the reference voltage Vref1 used for generating the output voltage Vout at the target level, for example.

Further, the details will be described later, in a time period before the OTA 110 operates, the supply of the AC voltage Vac has been stopped, and thus the feedback voltage Vfb has been lower than the reference voltage Vref3 (=Vref1). In this state, since the OTA 110 supplies a current to the "node X", the voltage Vx rises. Thus, the OTA 110 adjusts the voltage Vx such that the peak value of the inductor current IL is small when the AC voltage Vac is input. Note that the OTA 110 corresponds to a "first current adjustment circuit".

Figure 11:
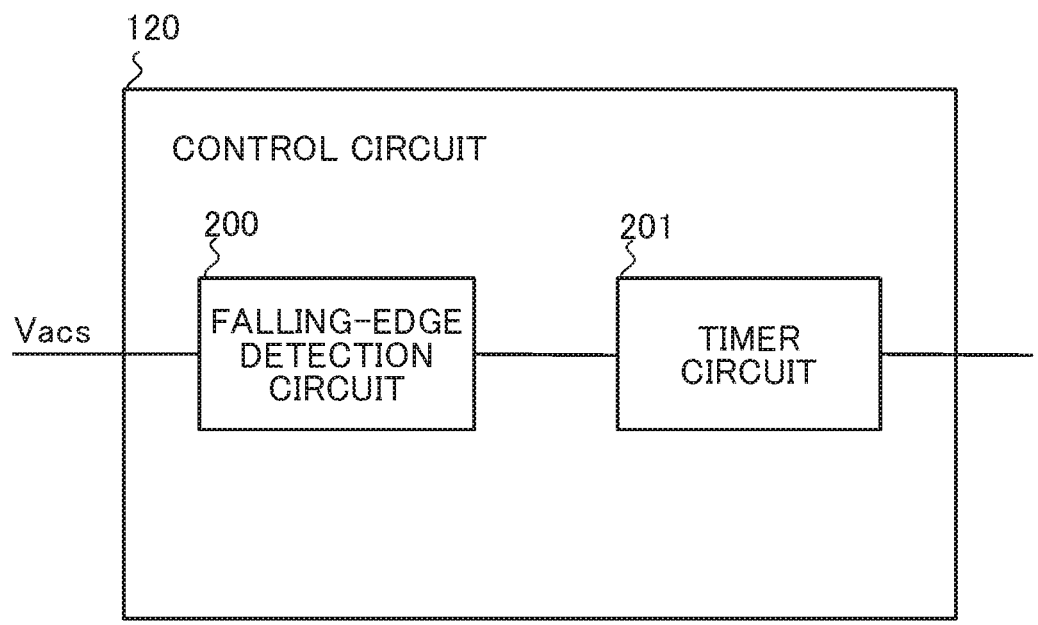
FIG. 11 is a diagram illustrating one example of a control circuit 120.

The control circuit 120 controls the OTA 110 so as to operate for a "predetermined time period Tc", when the AC voltage Vac is input, based on the voltage Vacs output from the input detection circuit 51. The control circuit 120 comprises, as illustrated in FIG. 11, a falling edge detection circuit 200 and a timer circuit 201.

The falling edge detection circuit 200 detects a falling edge of the voltage Vacs at a time when the AC voltage Vac is input, and the timer circuit 201 measures the "predetermined time period Tc" from the falling edge of the voltage Vacs. Then, the timer circuit 201 causes the OTA 110 to operate for the "predetermined time period Tc".

<<Switch 111 and Control Circuit 121>>

The switch 111 causes the power factor correction IC 25 to perform so-called "soft start", in other words, gently raise the output voltage Vout to the target level, when the AC voltage Vac is input. The switch 111 is connected between the terminal COMP connected with the output of the OTA 80 and the ground, and, for example, when the input of the AC voltage Vac is stopped, causes the capacitors 35 and 36 to be discharged so that the voltage Vcomp drops.

Note that although the details will be described later, for example, when the supply of the AC voltage Vac is stopped, the output voltage Vout drops, and thus the voltage Vcomp rises. In such a case, since the voltage Vx drops, the "target value" of the inductor current IL increases. However, the switch 111 according to an embodiment of the present disclosure can lower the voltage Vcomp and reduce the "target value" of the inductor current IL to a smaller value. As a result, for example, when the AC voltage Vac is restored, it is possible to increase the inductor current IL from such a smaller value, thereby implementing the "soft start".

The control circuit 121 controls ON and OFF of the switch 111, based on the voltage Vacs output from the input detection circuit 51, such that the voltage Vcomp changes in a predetermined "voltage range Y" when the supply of the AC voltage Vac is stopped. Here, the "voltage range Y" is a voltage range capable of implementing the "soft start" while suppressing the "surge voltage" when the AC voltage Vac is restored.

The control circuit 121 according to an embodiment of the present disclosure causes the switch 111 to be "ON" until the voltage Vcomp reaches the predetermined voltage V1 when the AC voltage Vac is not input and the voltage Vacs output from the input detection circuit 51 goes high.

Further, the control circuit 121 turns "OFF" the switch 111 when the voltage Vcomp drops and reaches the predetermined voltage V1 (>0). This can prevent taking longer time than needed for the "soft start" with the voltage Vcomp dropping to "0V", for example.

Further, the control circuit 121 turns "ON" the switch 111 when the voltage Vcomp rises and reaches a predetermined voltage V2 (> voltage V1). As a result, when the AC voltage Vac is not input and the voltage Vacs goes high, the voltage Vcomp changes in the "voltage range Y" from the voltage V1 to the voltage V2. Note that the control circuit 121 according to an embodiment of the present disclosure comprises a hysteresis comparator (not illustrated) that compares the voltage Vcomp with the voltage V1, V2, for example.

Further, when the AC voltage Vac is input and the voltage Vacs output from the input detection circuit 51 goes low, the control circuit 121 turns "OFF" the switch 111. Thus, when the AC voltage Vac is input, the OTA 80 generates the voltage Vcomp corresponding to the feedback voltage Vfb without any influence of the switch 111.

Note that the switch 111 and the control circuit 121 correspond to an "error adjustment circuit".

<<OTA 112 and Control Circuit 122>>

The OTA 112 raises the output voltage Vout to the target level in a short period of time, when the output voltage Vout drops in a state where the AC voltage Vac is input. The OTA 112 supplies a current corresponding to a difference between the feedback voltage Vfb and a predetermined reference voltage Vref4 to the "node X" between the resistors R1 and R2. Here, the reference voltage Vref4 is lower in level than the reference voltage Vref1 used for generating the output voltage Vout at the target level, for example.

Further, although the details will be described later, in a time period before the OTA 112 operates, for example, if a current flowing through the load 11 increases so that the load 11 is under "heavy load", the feedback voltage Vfb may become lower than the reference voltage Vref4 (<Vref1). In this state, since the OTA 112 receives a current from the "node X", the voltage Vx drops.

Accordingly, the OTA 112 adjusts the voltage Vx such that the peak value of the inductor current IL increases when the output voltage Vout drops. Note that the OTA 112 corresponds to a "second current adjustment circuit".

The control circuit 122 controls the OTA 112 so as to operate based on the voltage Vacs and the feedback voltage Vfb, only in a case where the feedback voltage Vfb becomes lower than the reference voltage Vref4 while the AC voltage Vac is being input.

<<Details of Control Circuit 122>>

Figure 12:
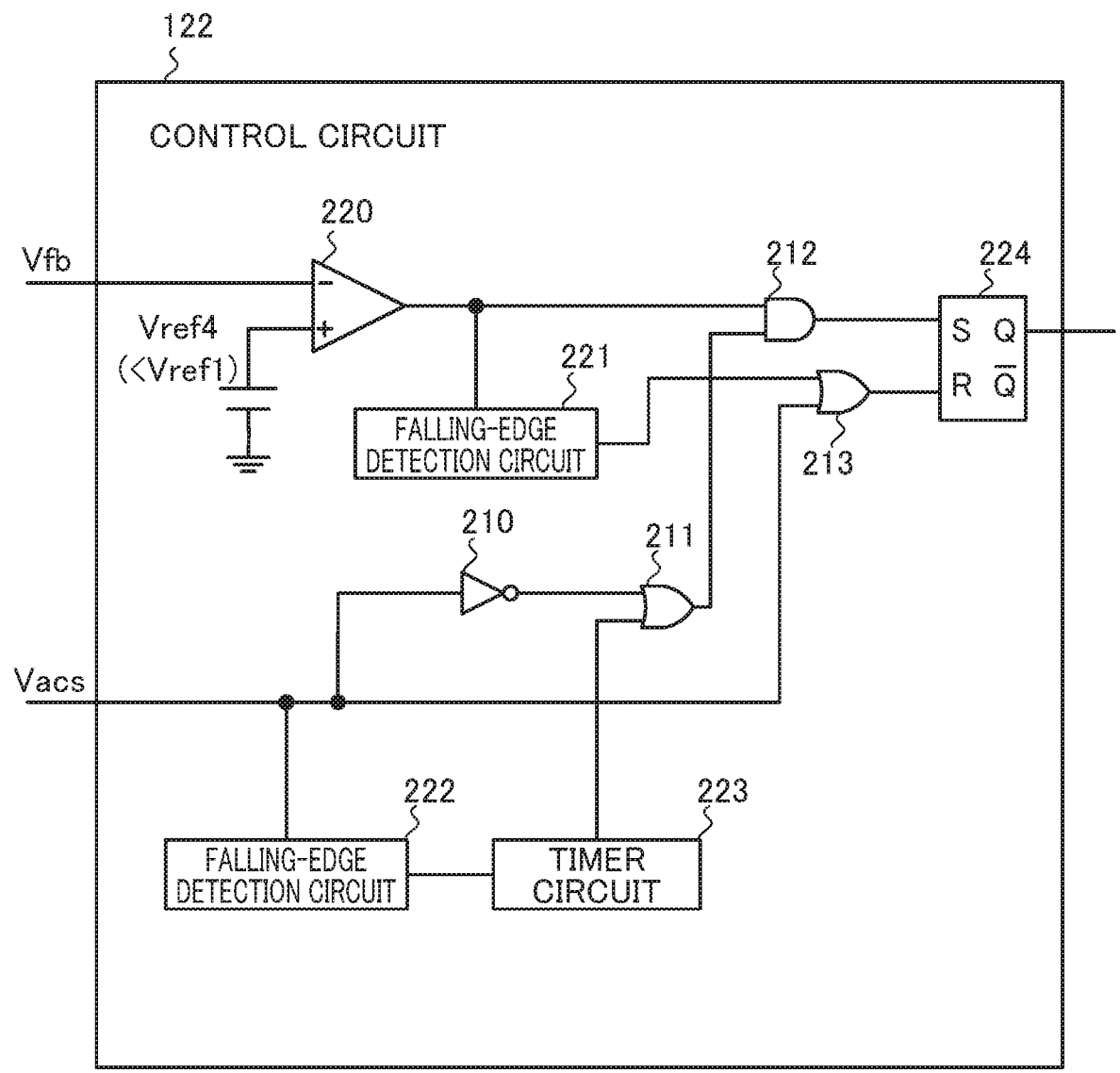
FIG. 12 is a diagram illustrating one example of a control circuit 122.

The control circuit 122 comprises, as illustrated in FIG. 12, an inverter 210, an OR circuit 211 and 213, an AND circuit 212, a comparator 220, a falling edge detection circuit 221 and 222, and a timer circuit 223.

The comparator 220 detects whether the feedback voltage Vfb has reached the reference voltage Vref4 for operating the OTA 112. The comparator 220 outputs a low signal when the feedback voltage Vfb is higher than the reference voltage Vref4, and outputs a high signal when the feedback voltage Vfb is lower than the reference voltage Vref4.

The falling edge detection circuit 221 generates a signal for stopping the operation of the OTA 112 when the feedback voltage Vfb becomes higher than the reference voltage Vref4. In specific, the falling edge detection circuit 221 outputs high pulse signal when the signal of the comparator 220 goes low from high.

The falling edge detection circuit 222 detects a falling edge where the voltage Vacs changes from high (the level indicating an interruption of the AC voltage Vac) to low (the level indicating the input of the AC voltage Vac), and outputs a pulse signal indicating that the AC voltage Vac is input.

The timer circuit 223 outputs a signal for masking the detection result of the comparator 220 for a "predetermined time period Td" since the AC voltage Vac has been input. In specific, when the pulse signal from the falling edge detection circuit 222 is input, the timer circuit 223 outputs a low signal for the "predetermined time period Td".

==When AC Voltage Vac is Input and the Feedback Voltage Vfb Drops==

First, a description will be given of the operation of the control circuit 122 when the AC voltage Vac is input and the feedback voltage Vfb drops. It is assumed hereinafter that an SR flip-flop 224 is reset in advance in an embodiment of the present disclosure.

When the AC voltage Vac is being input, the voltage Vacs output from the input detection circuit 51 is low, and thus a high signal from the inverter 210 is output to the AND circuit 212 via the OR circuit 211. Accordingly, in this situation, when the feedback voltage Vfb becomes lower than the reference voltage Vref4, the output of the comparator 220 goes high. Thus, a high signal for operating the OTA 112 is output from the Q output of the SR flip-flop 224.

Note that the feedback voltage Vfb becomes higher than the reference voltage Vref4, the falling edge detection circuit 221 outputs a high pulse signal. As a result, a low signal for stopping the operation of the OTA 112 is output from the Q output of the SR flip-flop 224.

===When AC Voltage Vac is Interrupted and then Restored===

Next, a description will be given of the operation of the control circuit 122 when the AC voltage Vac is restored after being interrupted.

When the AC voltage Vac is interrupted, the voltage Vacs output from the input detection circuit 51 goes high, and thus a low signal for stopping the operation of the OTA 112 is output from the Q output of the SR flip-flop 224.

Further, on this occasion, a low signal from the inverter 210 is output to the AND circuit 212 via the OR circuit 211. Accordingly, during this time period, the OTA 112 is inhibited from operating due to the output of the comparator 220.

Then, when the AC voltage Vac is restored and the input thereof is restarted, the voltage Vacs goes low, and thus a low signal for masking the detection result of the comparator 220 is output from the timer circuit 223 for the "predetermined time period Td". Accordingly, after the AC voltage Vac is restored, the operation of the OTA 112 remains stopped for the "predetermined time period Td".

Here, when the AC voltage Vac is restored and the OTA 112 operates, the OTA 112 adjusts the voltage Vx such that the peak value of the inductor current IL increases, as described above. As a result, when the AC voltage Vac is restored, the "surge voltage" may be generated. In an embodiment of the present disclosure, after the AC voltage Vac is restored, the OTA 112 remains stopped for the "predetermined time period Td" which is sufficient for the output voltage Vout to reach the target level, for example. Accordingly, in an embodiment of the present disclosure, the OTA 112 can be operated at a desirable timing.

Then, when the AC voltage Vac is restored and the "predetermined time period Td" has elapsed, the control circuit 122 controls the operation of the OTA 112 based on the detection result of the comparator 220.

It is assumed that the control circuit 122 according to an embodiment of the present disclosure controls the OTA 112 to remain stopped for the "predetermined time period Td" since the AC voltage Vac has been restored, but the present disclosure is not limited thereto. For example, instead of the control circuit 122, such a control circuit (not illustrated) may be used that controls the OTA 112 so as to remain stopped until the feedback voltage Vfb reaches a predetermined level (e.g., the reference voltage Vref1) since the AC voltage Vac has been restored.

===Operation of Power Factor Correction IC 25 when Output Voltage Vout has Dropped from Target Level===

Figure 13:
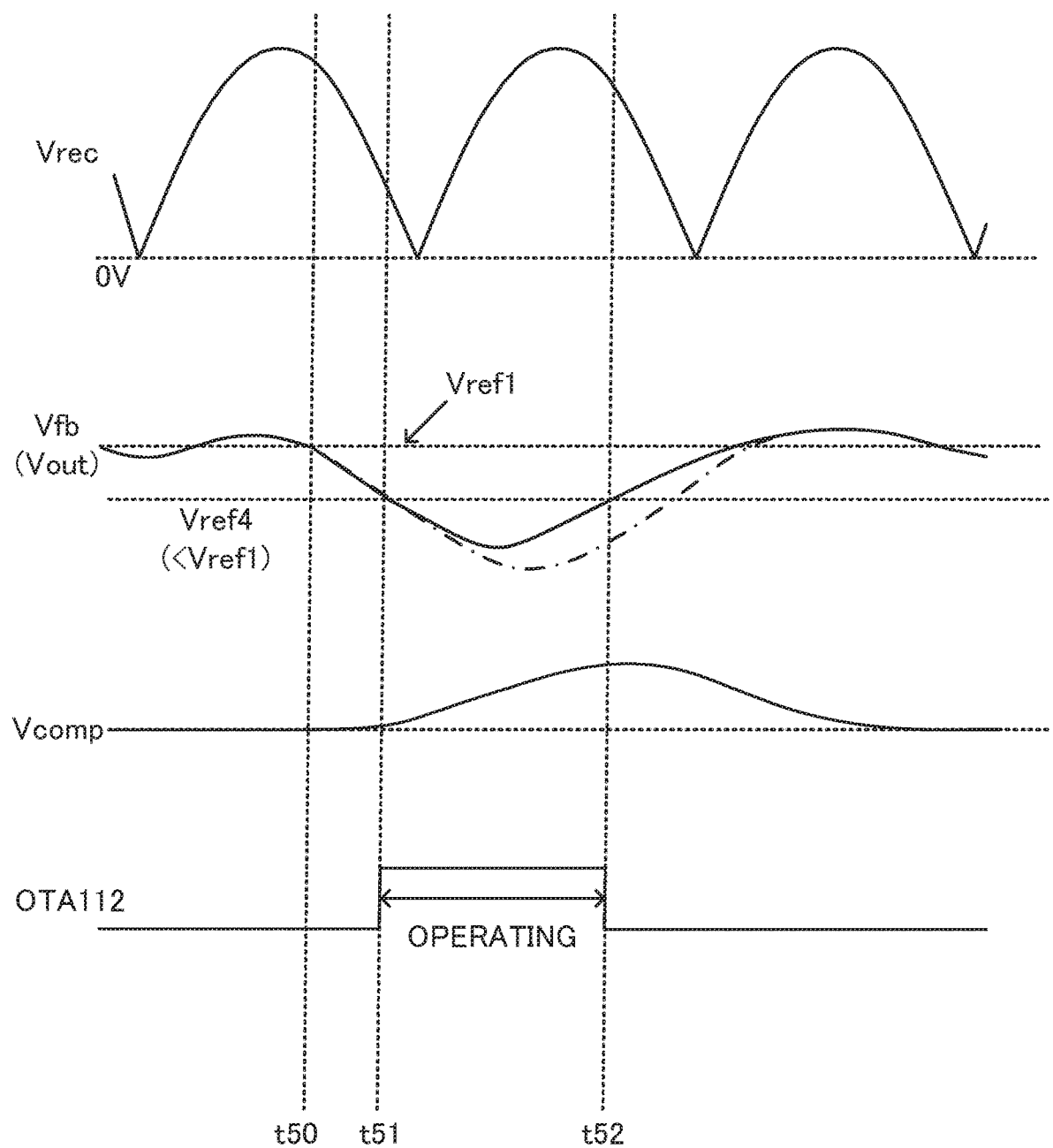
FIG. 13 is a diagram for explaining an operation of a power-factor correction IC 25.

FIG. 13 is a diagram for explaining the operation of the power factor correction IC 25 when the output voltage Vout has dropped from the target level. It is assumed here that the AC voltage Vac continues to be input.

For example, when a current flowing through the load 11 increases such that the load 11 is under "heavy load" at a time t50, the output voltage Vout drops, and thus the feedback voltage Vfb drops similarly. Note that, as has been described, since the capacitors 35 and 36 having large capacitances are connected to the output of the OTA 80, the voltage Vcomp does not change immediately.

Then, when the feedback voltage Vfb reaches the reference voltage Vref4 as the output voltage Vout drops at time t51, the control circuit 122 illustrated in FIG. 10 causes the OTA 112 to operate. Accordingly, the OTA 112 receives a current from the "node X" such that the voltage Vx decreases, that is, the peak value of the inductor current IL increases.

As a result, the power factor correction IC 25 can make the peak value of the "target value" of the inductor current IL higher than that in a case where the OTA 112 is not operated. Accordingly, for example, when comparing the case where the OTA 112 is not used (dashed-dotted line in FIG. 13), a drop in the output voltage Vout is reduced.

Then, when the feedback voltage Vfb reached the reference voltage Vref4 as the output voltage Vout rises at a time t52, the operation of the OTA 112 is stopped. As a result, in the power factor correction IC 25 according to an embodiment of the present disclosure, the output voltage Vout can reach the target level in a shorter period of time as compared with the case where the OTA 112 is not used.

===Operation of Power Factor Correction IC 25 when the AC Voltage Vac is Interrupted and then Restored===

Figure 14:
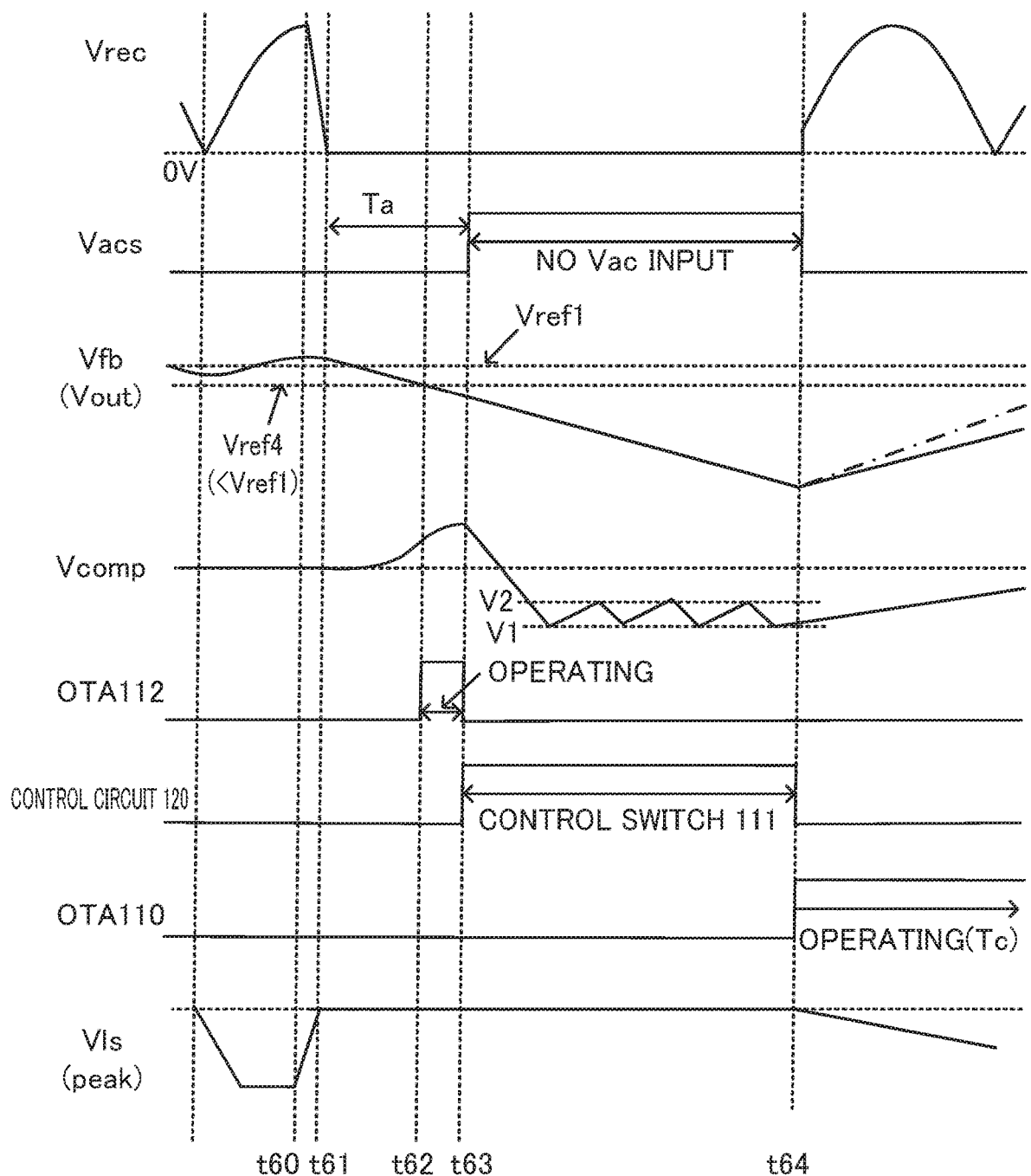
FIG. 14 is a diagram for explaining an operation of a power-factor correction IC 25.

FIG. 14 is a diagram for explaining the operation of the power factor correction IC 25 when the AC voltage Vac is interrupted and then restored. Note that in FIG. 14, the voltage Vls is expressed with its peak value, for convenience.

For example, when the AC voltage Vac is interrupted at a time t60, the level of the AC voltage Vac drops to "0V" at a time t61, for example.

When the AC voltage Vac becomes "0V" at the time t61, the inductor current IL becomes "0" as well. Thus, the timer circuit 61 of the input detection circuit 51 in FIG. 4 starts measuring time.

Then, for example, when the feedback voltage Vfb reaches the reference voltage Vref4 as the output voltage Vout drops at a time t62, the control circuit 122 causes the OTA 112 to operate.

However, at a time t63 when the predetermined time period Ta has elapsed from the time t61, the input detection circuit 51 changes the voltage Vacs to high. As a result, the control circuit 122 causes the OTA 112 to stop operating.

Further, at a time t63 when the voltage Vacs goes high, the control circuit 121 starts controlling ON and OFF of the switch 111. As a result, the voltage Vcomp drops and changes in the "voltage range Y" from the voltage V1 to the voltage V2.

Then, when the AC voltage Vac is restored at a time t64, the voltage Vacs goes low, the control circuit 121 turns off the switch 111. As a result, the voltage Vcomp rises form a low level, thereby implementing the "soft start".

Further, when the voltage Vacs goes low at the time t64, the control circuit 120 causes the OTA 110 to operate for the predetermined time period Tc. As has been described, since the OTA 110 supplies a current to the "node X", the voltage Vx rises and the peak value of the inductor current IL decreases. This makes it possible to implement the "soft start" where the output voltage Vout (solid line at the time t64 and thereafter in FIG. 14) is gently changed, as compared with the output voltage Vout (dashed-dotted line in FIG. 14) in the case where the OTA 110 is not operated, for example.

Summary

Hereinabove, the AC-DC converter 10 according to an embodiment of the present disclosure has been described. The adjustment circuit 85 is connected to the "input node" of the target value generating circuit 81 (the input node of the inverting amplifier circuit 73) and the "output node" (node X). Then, the adjustment circuit 85 adjusts the "target value" of the inductor current IL by changing a voltage at the "input node" or the "output node" such that the AC-DC converter 10 is desirably operated. Accordingly, even in a case where an operating condition of the power factor correction IC 25 greatly changes, the AC-DC converter 10 can be desirably operated.

Further, the adjustment circuit 85 changes a voltage at the "input node" or the "output node" of the target value generating circuit 81 by sourcing or receiving a current with respect to the "input node" or the "output node". Accordingly, in an embodiment of the present disclosure, it is possible to easily change a voltage at the "input node" or the "output node".

The adjustment circuit 85 adjusts the "target value" of the inductor current IL, for example, on condition that the AC voltage Vac is interrupted or the feedback voltage Vfb reaches the reference voltage Vref4 ("predetermined condition"). Accordingly, even in a case where the operating condition of the power factor correction IC 25 greatly changes, the AC-DC converter 10 can be desirably operated.

Further, the OTA 110 and the switch 111 of the adjustment circuit 85 reduce the "target value" of the inductor current IL when the AC voltage Vac is not being input. Accordingly, it is possible to prevent the large inductor current IL from flowing when the AC voltage Vac is restored, thereby being able to safely operate the AC-DC converter 10.

Further, the OTA 110 can reduce the "target value" of the inductor current IL by supplying a current to the "node X".

Further, in the case where the AC voltage Vac is not being input, for example, a bias current circuit (not illustrated) may be used to supply a predetermined current to the "node X", thereby reducing the "target value" of the inductor current IL. However, the OTA 110 can change a current value of a current to be supplied to the "node X" according to the feedback voltage Vfb. Thus, it is possible to more reliably prevent the large inductor current IL from flowing than in a case of using the bias current circuit that generates a predetermined current.

Further, in the case where the AC voltage Vac is not being input, it is possible to prevent the large inductor current IL from flowing when the AC voltage Vac is restored, by not directly adjusting the voltage Vx at the "node X" but adjusting the voltage Vcomp, as well.

Further, the adjustment of the voltage Vcomp can be implemented by using the switch 111 for discharging the capacitors 35 and 36, for example. Note that, in an embodiment of the present disclosure, the voltage Vcomp is adjusted to fall within the "voltage range Y" by controlling the switch 111, but the present disclosure is not limited thereto. For example, also in the case where the AC voltage Vac is not being input, the switch 111 may be turned on so that the voltage Vcomp becomes "0V". Even in such a case, it is possible to implement the "soft start" when the AC voltage Vac is restored.

Further, the OTA 112 in the adjustment circuit 85 increases the "target value" of the inductor current IL, when the feedback voltage Vfb has dropped to the reference voltage Vref4 while the AC voltage Vac is being input. Accordingly, it is possible to prevent the output voltage Vout from greatly dropping when the load 11 is under "heavy load", for example.

Further, the OTA 112 can increase the "target value" of the inductor current IL by receiving a current from the "node X".

Further, in the case where the feedback voltage Vfb drops, for example, a bias current circuit (not illustrated) may be used to receive a predetermined current from the "node X" and increase the "target value" of the inductor current IL. However, the OTA 112 can change a current value of a current to be received from the "node X", according to the feedback voltage Vfb. For example, in a case where the output voltage Vout greatly drops, the OTA 112 can receive a large current from the "node X" and increase the "target value" of the inductor current IL. Accordingly, it is possible to prevent the output voltage Vout from dropping, as compared with the case of using the bias current circuit (not illustrated).

Further, even in the case where the inductor current IL does not reach the "target value", the drive circuit 54 turns off the NMOS transistor 26 when the "predetermined time period Tb" has elapsed since the NMOS transistor 26 has been turned on. Accordingly, for example, as illustrated in FIG. 9, the peak value of the inductor current IL can be shaped into a "trapezoidal" waveform, thereby improving the power factor.

Further, in the drive circuit 54, the waveform of the peak value of the inductor current IL is shaped into a "trapezoidal" waveform in a half cycle of the AC voltage Vac, however, the "trapezoid" is not limited to a mathematically strict trapezoid but may also be a substantially trapezoid. Note that the substantially trapezoid includes, for example, a shape whose upper base and lower base are not parallel.

Accordingly, for example, the "target value" of the inductor current IL may change according to the level of the AC voltage Vac in the half cycle of the AC voltage Vac. However, a waveform of the peak value of the inductor current IL obtained in such a case also results in a substantially trapezoidal waveform.

Embodiments of the present disclosure described above are simply for facilitating the understanding of the present disclosure and are not in any way to be construed as limiting the present disclosure. The present disclosure may variously be changed or altered without departing from its gist and encompass equivalents thereof.

For example, it is assumed that the voltage Vx is adjusted by adjusting a current flowing through the "node X", but the present disclosure is not limited thereto. For example, the voltage Vx may be adjusted by employing variable resistors as the resistors R1 and R2 for generating the voltage Vx and adjusting the resistance values of the resistors R1 and R2 according to an operating condition. Even in such a configuration, it is possible to achieve similar effects as in embodiments of the present disclosure.

What is claimed is:

1. An integrated circuit for a power supply circuit that generates an output voltage from an AC voltage, the power supply circuit having a rectifier circuit that rectifies the AC voltage,
an inductor to be applied with a rectified voltage from the rectifier circuit, and
a transistor that controls an inductor current flowing through the inductor,
the integrated circuit performing switching of the transistor based on the output voltage generated from the AC voltage and the inductor current, the integrated circuit comprising:
an error output circuit that receives a feedback voltage corresponding to the output voltage, and outputs an error between the feedback voltage and a reference voltage;
a target value generating circuit that generates a target value of the inductor current based on the error;
an adjustment circuit that is connected to the target value generating circuit, and adjusts the target value;

a first comparison circuit that compares the inductor current and a predetermined value;
a second comparison circuit that compares the inductor current and the target value;
a drive circuit that turns on the transistor when the inductor current reaches the predetermined value, and turns off the transistor when the inductor current reaches the target value or a predetermined time period has elapsed since the transistor has been turned on; and
a turn-off circuit that measures the predetermined time period since the transistor has been turned on, wherein
in a first state, the drive circuit turns on the transistor, when the inductor current reaches the predetermined value, and turns off the transistor, when the inductor current reaches the target value, and
in a second state, the drive circuit turns on the transistor, when the inductor current reaches the predetermined value, and turns off the transistor, when the predetermined time period has elapsed since the transistor has been turned on based on a measurement result of the turn-off circuit.

2. The integrated circuit according to claim 1, wherein the adjustment circuit supplies a current to the target value generating circuit, or receives a current from the target value generating circuit.

3. The integrated circuit according to claim 1, wherein the adjustment circuit adjusts the target value when at least one of the AC voltage and the feedback voltage satisfies a predetermined condition.

4. The integrated circuit according to claim 1, wherein the adjustment circuit reduces the target value when the AC voltage is not being input to the rectifier circuit.

5. The integrated circuit according to claim 4, wherein the target value generating circuit comprises
a voltage generating circuit to which the error is input, the voltage generating circuit being configured to generate a voltage corresponding to the error, and
a voltage divider circuit that divides the voltage generated by the voltage generating circuit, and outputs a result of the division as the target value, the voltage divider circuit including a resistor; and
the adjustment circuit comprises
a first current adjustment circuit that adjusts a current flowing through the resistor of the voltage divider circuit so as to reduce the target value, when the AC voltage is not being input to the rectifier circuit.

6. The integrated circuit according to claim 5, wherein the voltage generating circuit is an amplifier circuit that amplifies the error, and
the first current adjustment circuit is a transconductance amplifier that causes a current corresponding to the feedback voltage to flow through the resistor.

7. The integrated circuit according to claim 1, wherein the adjustment circuit comprises an error adjustment circuit that adjusts the error so as to reduce the target value when the AC voltage is not being input to the rectifier circuit.

8. The integrated circuit according to claim 7, wherein the power supply circuit further includes a capacitor having a voltage indicating the error from the error output circuit; and
the error adjustment circuit comprises a switch that discharges the capacitor.

9. The integrated circuit according to claim 1, wherein the adjustment circuit increases the target value, when the feedback voltage has dropped to a predetermined level while the AC voltage is being input to the rectifier circuit.

10. The integrated circuit according to claim 9, wherein the target value generating circuit comprises
a voltage generating circuit to which the error is input, the voltage generating circuit being configured to generate a voltage corresponding to the error, and
a voltage divider circuit that divides the voltage generated by the voltage generating circuit, and outputs a result of the division as the target value, the voltage divider circuit including a resistor; and
the adjustment circuit comprises
a second current adjustment circuit that adjusts a current flowing through the resistor of the voltage divider circuit so as to increase the target value, when the feedback voltage has dropped to the predetermined level while the AC voltage is being input to the rectifier circuit.

11. The integrated circuit according to claim 10, wherein the voltage generating circuit is an amplifier circuit that amplifies the error, and
the second current adjustment circuit is a transconductance amplifier that causes a current corresponding to the feedback voltage to flow through the resistor.

12. The integrated circuit according to claim 1, wherein the drive circuit drives the transistor to perform switching, and shapes a waveform of a peak value of the inductor current in a half cycle of the AC voltage into a trapezoidal waveform.

13. An integrated circuit for a power supply circuit that generates an output voltage from an AC voltage, the power supply circuit having
a rectifier circuit that rectifies the AC voltage,
an inductor to be applied with a rectified voltage from the rectifier circuit, and
a transistor that controls an inductor current flowing through the inductor,
the integrated circuit performing switching of the transistor based on the output voltage generated from the AC voltage and the inductor current, the integrated circuit comprising:
an error output circuit that receives a feedback voltage corresponding to the output voltage, and outputs an error between the feedback voltage and a reference voltage;
a target value generating circuit that generates a target value of the inductor current based on the error;
a first comparison circuit that compares the inductor current and a predetermined value;
a second comparison circuit that compares the inductor current and the target value;
a drive circuit that turns on the transistor when the inductor current reaches the predetermined value, and turns off the transistor when the inductor current reaches the target value;
a first adjustment circuit that reduces the target value, when the AC voltage is not being input to the rectifier circuit; and
a second adjustment circuit that increases the target value, when the feedback voltage has dropped to a predetermined level while the AC voltage is being input to the rectifier circuit.

14. An integrated circuit for a power supply circuit that generates an output voltage from an AC voltage, the power supply circuit having a rectifier circuit that rectifies the AC voltage, and an inductor and a transistor connected in series, to be applied with a rectified voltage from the rectifier circuit, the inductor having
- a first terminal connected to an output terminal of the rectifier circuit, the first terminal being applied with the rectified voltage, and
- a second terminal connected to the transistor, the transistor controlling an inductor current that is a current flowing through the inductor, the integrated circuit performing switching of the transistor based on the output voltage generated from the AC voltage and the inductor current, the integrated circuit comprising:

an error output circuit that receives a feedback voltage corresponding to the output voltage, and outputs an error between the feedback voltage and a reference voltage;

a target value generating circuit that generates a target value of the inductor current based on the error;

a first comparison circuit that compares the inductor current and a predetermined value;

a second comparison circuit that compares the inductor current and the target value;

a drive circuit that turns on the transistor, when the inductor current reaches the predetermined value, and turns off the transistor, when the inductor current reaches the target value or a predetermined time period has elapsed since the transistor has been turned on; and a turn-off circuit that measures the predetermined time period since the transistor has been turned on, wherein in a first state, the drive circuit turns on the transistor, when the inductor current reaches the predetermined value, and turns off the transistor, when the inductor current reaches the target value, and in a second state, the drive circuit turns on the transistor, when the inductor current reaches the predetermined value, and turns off the transistor, when the predetermined time period has elapsed since the transistor has been turned on based on a measurement result of the turn-off circuit.

15. The integrated circuit according to claim 14, wherein the drive circuit drives the transistor to perform switching, and shapes a waveform of a peak value of the inductor current in a half cycle of the AC voltage into a trapezoidal waveform.

16. The integrated circuit according to claim 14, wherein in the first state while a voltage value of the AC voltage is larger than a first voltage value, the drive circuit turns off the transistor when the inductor current reaches the target value, and in the second state while the voltage value of the AC voltage is smaller than the first voltage value, the drive circuit turns off the transistor, when the predetermined time period has elapsed since the transistor has been turned on.

17. A power supply circuit that generates an output voltage from an AC voltage, the power supply circuit comprising:

a rectifier circuit that rectifies the AC voltage;

an inductor to be applied with a rectified voltage from the rectifier circuit;

a transistor that controls an inductor current flowing through the inductor; and an integrated circuit that performs switching of the transistor, based on the output voltage and the inductor current flowing through the inductor, the integrated circuit comprising:

an error output circuit that receives a feedback voltage corresponding to the output voltage, and outputs an error between the feedback voltage and a reference voltage;

a target value generating circuit that generates a target value of the inductor current based on the error;

an adjustment circuit that is connected to the target value generating circuit, and adjusts the target value;

a first comparison circuit that compares the inductor current and a predetermined value;

a second comparison circuit that compares the inductor current and the target value;

a drive circuit that turns on the transistor when the inductor current reaches the predetermined value, and turns off the transistor when the inductor current reaches the target value or a predetermined time period has elapsed since the transistor has been turned on; and a turn-off circuit that measures the predetermined time period since the transistor has been turned on, wherein in a first state, the drive circuit turns on the transistor, when the inductor current reaches the predetermined value, and turns off the transistor, when the inductor current reaches the target value, and in a second state, the drive circuit turns on the transistor, when the inductor current reaches the predetermined value, and turns off the transistor, when the predetermined time period has elapsed since the transistor has been turned on based on a measurement result of the turn-off circuit.

* * * * *